United States Patent
Paz et al.

(10) Patent No.: US 12,506,645 B2
(45) Date of Patent: Dec. 23, 2025

(54) CHANNEL ESTIMATION BASED ON SAMPLES OF DOWNLINK TRANSMISSION

(71) Applicant: QUALCOMM Incorporated, San Diego, CA (US)

(72) Inventors: Daniel Paz, Atlit (IL); Assaf Touboul, Netanya (IL); Michael Levitsky, Rehovot (IL); Tom Barak, Rehovot (IL)

(73) Assignee: Qualcomm Incorporated, San Diego, CA (US)

(*) Notice: Subject to any disclaimer, the term of this patent is extended or adjusted under 35 U.S.C. 154(b) by 431 days.

(21) Appl. No.: 18/303,926

(22) Filed: Apr. 20, 2023

(65) Prior Publication Data
US 2024/0356782 A1  Oct. 24, 2024

(51) Int. Cl.
*H04L 25/02* (2006.01)
*H04B 7/06* (2006.01)
*H04L 5/00* (2006.01)

(52) U.S. Cl.
CPC ......... *H04L 25/023* (2013.01); *H04B 7/0626* (2013.01); *H04L 5/0053* (2013.01)

(58) Field of Classification Search
CPC . H04B 7/0626; H04L 25/0202; H04L 25/023; H04L 25/03343; H04L 5/0053
See application file for complete search history.

(56) References Cited

U.S. PATENT DOCUMENTS

| | | | |
|---|---|---|---|
| 9,749,086 B1* | 8/2017 | Ankarali | H04W 12/08 |
| 2020/0296550 A1* | 9/2020 | Akkarakaran | G01S 1/20 |
| 2022/0124636 A1* | 4/2022 | Kim | H04W 52/14 |
| 2022/0200767 A1* | 6/2022 | Park | H04B 7/0478 |
| 2023/0318691 A1* | 10/2023 | Jeon | G06N 3/08 |
| 2023/0412227 A1* | 12/2023 | Abebe | H04W 76/20 |
| 2023/0421225 A1* | 12/2023 | Kim | H04B 7/063 |
| 2024/0097869 A1* | 3/2024 | Lee | H04B 17/345 |
| 2024/0187283 A1* | 6/2024 | Chai | H04L 27/26025 |
| 2024/0259058 A1* | 8/2024 | Shehzad | H04B 17/309 |
| 2024/0275519 A1* | 8/2024 | Timo | H04B 7/0658 |
| 2024/0348306 A1* | 10/2024 | Shabara | H04B 7/0626 |
| 2024/0349259 A1* | 10/2024 | Lu | H04W 72/25 |
| 2024/0356782 A1* | 10/2024 | Paz | H04L 5/0053 |
| 2024/0429975 A1* | 12/2024 | Caporal Del Barrio | H04B 7/0413 |

(Continued)

OTHER PUBLICATIONS

"Other aspects on AI/ML for CSI feedback enhancement"; Samsung; 3GPP TSG RAN WG1 #109-e R1-2203898 e-Meeting, May 9-May 20, 2022 (Year: 2022).*

(Continued)

*Primary Examiner* — Benjamin H Elliott, IV
(74) *Attorney, Agent, or Firm* — Harrity & Harrity, LLP

(57) ABSTRACT

Various aspects of the present disclosure generally relate to wireless communication. In some aspects, a user equipment (UE) may transmit a first downlink transmission. The UE may receive an uplink transmission that includes channel state information including an indication of one or more samples of the first downlink transmission, wherein the one or more samples, before reception of the uplink transmission, are unprocessed for a channel estimation. The UE may transmit a second downlink transmission in accordance with the channel estimation that is based at least in part on the one or more samples. Numerous other aspects are described.

30 Claims, 12 Drawing Sheets

(56) References Cited

U.S. PATENT DOCUMENTS

2025/0038816 A1\* 1/2025 Beluri ................. H03M 7/70
2025/0184890 A1\* 6/2025 Rao ................. H04W 28/0221

OTHER PUBLICATIONS

"Further aspects of AI/ML for CSI feedback"; Lenovo; 3GPP TSG RAN WG1 #109-e R1-2204418 e-Meeting, May 9-20, 2022 (Year: 2022).\*

"Discussions on Sub-Use Cases in AI/ML for CSI Feedback Enhancement"; TCL Communication; 3GPP TSG RAN WG1 Meeting #109-e R1-2204568 e-Meeting, May 9-20, 2022 (Year: 2022).\*

Alaaeldin M., et al., "Quantized vs. Analog Channel Feedback for FDD Massive MIMO Systems with Multiple-Antenna Users," 2021 IEEE 32nd Annual International Symposium on Personal, Indoor and Mobile Radio Communications, Sep. 13-16, 2021, pp. 1-7.

International Search Report and Written Opinion—PCT/US2024/020919—ISA/EPO—Jul. 5, 2024.

Nortel: "Channel Sounding Overhead Analysis", 3GPP TSG-RAN Working Group 1 Meeting #44, R1-060656, 3rd Generation Partnership Project, Mobile Competence Centre, 650, Route Des Lucioles, F-06921 Sophia-Antipolis Cedex, France, vol. TSG RAN, No. Denver, Colorado USA, Feb. 13, 2006-Feb. 17, 2006, 10 Pages, Feb. 9, 2006, XP050596052, p. 3.

Nosrat-Makouei B., et al., "Pilot Feedback Equalization for Time Varying OFDM Systems", Electrical and Computer Engineering, 2007. CCECE 2007. Canadian Conference on, IEEE, PI, Apr. 1, 2007, pp. 48-51, XP031176463, Section III, figure 1.

\* cited by examiner

CHANNEL ESTIMATION BASED ON SAMPLES OF DOWNLINK TRANSMISSION

FIELD OF THE DISCLOSURE

Aspects of the present disclosure generally relate to wireless communication and to techniques and apparatuses for channel estimation based on samples of a downlink transmission.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more network nodes that support communication for wireless communication devices, such as a user equipment (UE) or multiple UEs. A UE may communicate with a network node via downlink communications and uplink communications. "Downlink" (or "DL") refers to a communication link from the network node to the UE, and "uplink" (or "UL") refers to a communication link from the UE to the network node. Some wireless networks may support device-to-device communication, such as via a local link (e.g., a sidelink (SL), a wireless local area network (WLAN) link, and/or a wireless personal area network (WPAN) link, among other examples).

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

Some aspects described herein relate to a method of wireless communication performed by a user equipment (UE). The method may include transmitting a first downlink transmission. The method may include receiving an uplink transmission that includes channel state information (CSI) including an indication of one or more samples of the first downlink transmission, wherein the one or more samples, before reception of the uplink transmission, are unprocessed for a channel estimation. The method may include transmitting a second downlink transmission in accordance with the channel estimation that is based at least in part on the one or more samples.

Some aspects described herein relate to a method of wireless communication performed by an extended reality (XR) device. The method may include receiving a first downlink transmission. The method may include transmitting an uplink transmission that includes CSI including an indication of one or more samples of the first downlink transmission, wherein the one or more samples, before transmission of the uplink transmission, are unprocessed for a channel estimation. The method may include receiving a second downlink transmission in accordance with the channel estimation that is based at least in part on the one or more samples.

Some aspects described herein relate to a UE for wireless communication. The UE may include a memory and one or more processors coupled to the memory. The one or more processors may be configured to transmit a first downlink transmission. The one or more processors may be configured to receive an uplink transmission that includes CSI including an indication of one or more samples of the first downlink transmission, wherein the one or more samples, before reception of the uplink transmission, are unprocessed for a channel estimation. The one or more processors may be configured to transmit a second downlink transmission in accordance with the channel estimation that is based at least in part on the one or more samples.

Some aspects described herein relate to an XR device for wireless communication. The XR device may include a memory and one or more processors coupled to the memory. The one or more processors may be configured to receive a first downlink transmission. The one or more processors may be configured to transmit an uplink transmission that includes CSI including an indication of one or more samples of the first downlink transmission, wherein the one or more samples, before transmission of the uplink transmission, are unprocessed for a channel estimation. The one or more processors may be configured to receive a second downlink transmission in accordance with the channel estimation that is based at least in part on the one or more samples.

Some aspects described herein relate to a non-transitory computer-readable medium that stores a set of instructions for wireless communication by a UE. The set of instructions, when executed by one or more processors of the UE, may cause the UE to transmit a first downlink transmission. The set of instructions, when executed by one or more processors of the UE, may cause the UE to receive an uplink transmission that includes CSI including an indication of one or more samples of the first downlink transmission, wherein the one or more samples, before reception of the uplink transmission, are unprocessed for a channel estimation. The set of instructions, when executed by one or more processors of the UE, may cause the UE to transmit a second downlink transmission in accordance with the channel estimation that is based at least in part on the one or more samples.

Some aspects described herein relate to a non-transitory computer-readable medium that stores a set of instructions for wireless communication by a one or more instructions that, when executed by one or more processors of an XR device. The set of instructions, when executed by one or more processors of the XR device, may cause the XR device to receive a first downlink transmission. The set of instructions, when executed by one or more processors of the XR device, may cause the XR device to transmit an uplink transmission that includes CSI including an indication of one or more samples of the first downlink transmission, wherein the one or more samples, before transmission of the uplink transmission, are unprocessed for a channel estimation. The set of instructions, when executed by one or more processors of the XR device, may cause the XR device to receive a second downlink transmission in accordance with the channel estimation that is based at least in part on the one or more samples.

Some aspects described herein relate to an apparatus for wireless communication. The apparatus may include means for transmitting a first downlink transmission. The apparatus may include means for receiving an uplink transmission that includes CSI including an indication of one or more samples of the first downlink transmission, wherein the one or more samples, before reception of the uplink transmission, are unprocessed for a channel estimation. The apparatus may include means for transmitting a second downlink transmission in accordance with the channel estimation that is based at least in part on the one or more samples.

Some aspects described herein relate to an apparatus for wireless communication. The apparatus may include means for receiving a first downlink transmission. The apparatus may include means for transmitting an uplink transmission that includes CSI including an indication of one or more samples of the first downlink transmission, wherein the one or more samples, before transmission of the uplink transmission, are unprocessed for a channel estimation. The apparatus may include means for receiving a second downlink transmission in accordance with the channel estimation that is based at least in part on the one or more samples.

Aspects generally include a method, apparatus, system, computer program product, non-transitory computer-readable medium, UE, base station, network entity, network node, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Figure 1:
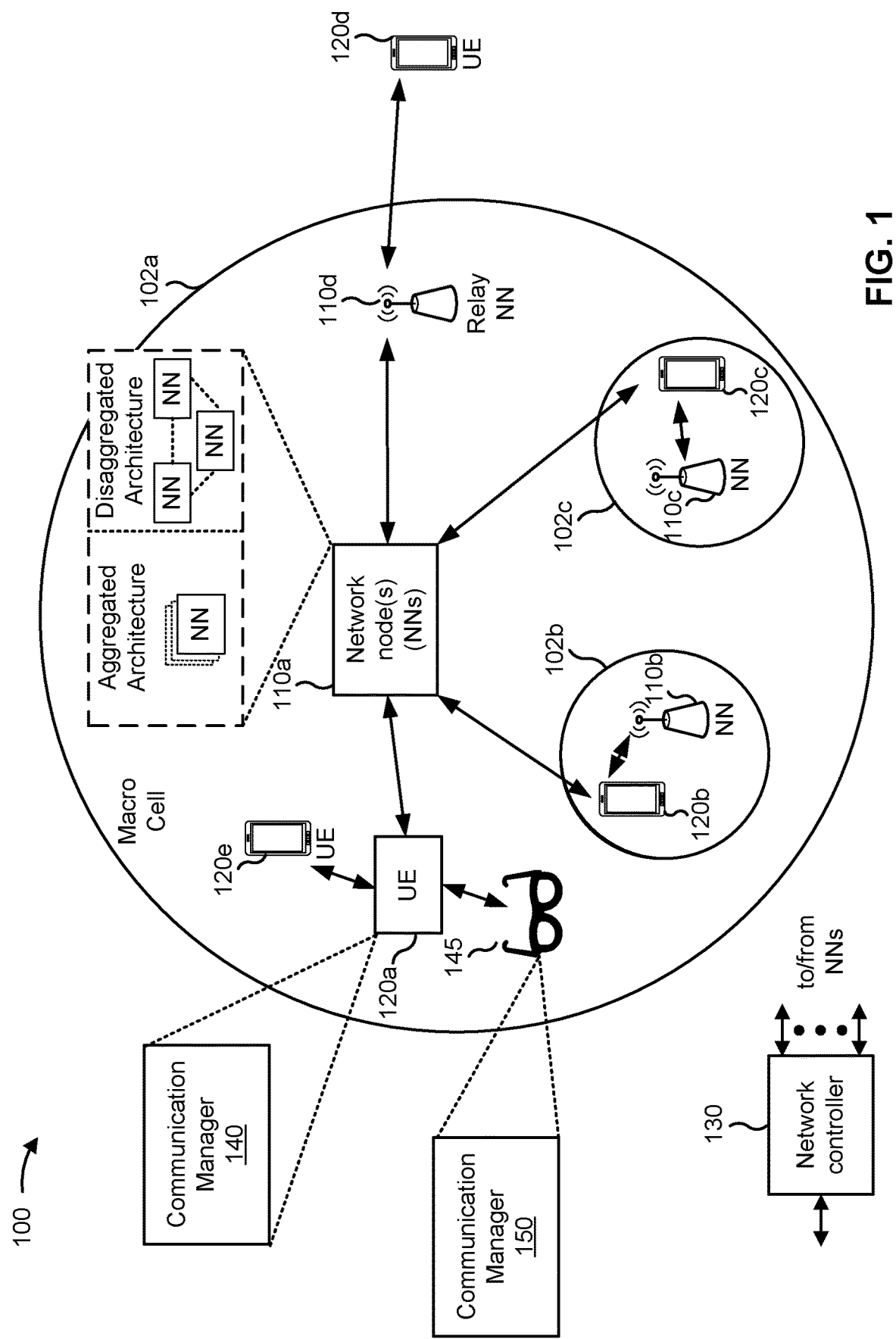
FIG. 1 is a diagram illustrating an example of a wireless network, in accordance with the present disclosure.

Various aspects relate generally to wireless communication and more particularly to extended reality (XR) devices.

Some aspects more specifically relate to offloading of processing operations from an XR device to a user equipment (UE). In some examples, XR devices, such as XR wearable glasses, may provide XR services (e.g., rendered video data or XR data) via a display of the XR device. However, XR services (e.g., rendering data in real-time) may involve heavy batteries, high-complexity processing, and/or large power consumption. Heavy batteries may cause the XR device to be uncomfortable for a user (e.g., a wearer of an XR wearable device), and high-complexity processing and large power consumption may generate a level of heat that is uncomfortable or dangerous for the user. For example, XR devices may have limited heat dissipation ability because heat dissipation ability is proportional to the surface size of XR devices. XR glasses, for example, may have a lower heat dissipation ability than a UE because the XR glasses may have a surface size that is smaller than that of the UE.

Shifting processing from the XR device to a companion device, such as a UE, may enable lighter and cooler XR devices that perform less intensive processing. For example, the UE (instead of the XR device) may perform channel estimation and/or channel equalization (e.g., pre-equalization) for the UE-to-XR device link. However, the channel estimation may be based on channel state information (CSI) of the UE-to-XR device link, which the UE may have no a priori knowledge of.

Some implementations are provided herein for channel estimation based on one or more samples of a downlink transmission (e.g., a transmission over the UE-to-XR-device link). In some examples, the UE may transmit, and the XR device may receive, a first downlink transmission. The XR device may transmit, and the UE may receive, an uplink transmission (e.g., a transmission over the XR-device-to-UE link) that includes CSI. The CSI may include an indication of one or more samples of the first downlink transmission. The one or more samples, before transmission (by the XR device) or reception (by the UE) of the uplink transmission, may be unprocessed for a channel estimation. In some examples, the UE may perform the channel estimation based at least in part on the one or more samples. The UE may transmit, and the XR device may receive, a second downlink transmission (e.g., via the downlink channel), in accordance with the channel estimation, that is based at least in part on the one or more samples.

The subject matter described in this disclosure can be implemented to realize one or more of the following potential advantages. In some examples, by transmitting the one or more samples to the UE, the described techniques can be used to shift the channel estimation and channel equalization operations from the XR device to the UE. For example, the UE may perform channel estimation of the downlink channel based on the sample(s) and pre-equalize the second downlink transmission on behalf of the XR device. Thus, the XR device may avoid performing high-complexity operations involved in channel estimation and channel equalization, which may enable the XR device to have lighter batteries and generate less heat.

The downlink channel that carries the first downlink transmission and the second downlink transmission may or may not be reciprocal with the uplink channel that carries the uplink transmission. If the downlink channel is not reciprocal, then the UE cannot perform the channel estimation based on, for example, the first uplink communications. In such cases, the XR device may indicate (e.g., signal) CSI-related information (e.g., at least a partial CSI report) to the UE, which may enable the UE to run the downlink channel and noise estimation procedures locally instead of at the XR device, when reciprocity does not hold. If the downlink channel is reciprocal, then although the channel estimation may be performed entirely by the UE based on uplink RSs without CSI-related signaling from the XR device, transmitting the uplink transmission may enable the UE to capture a noise estimation (e.g., XR device noise, residual channel estimation error components, or the like) that would not be available using channel estimation based on uplink RSs.

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more network nodes 110 (shown as a network node 110a, a network node 110b, a network node 110c, and a network node 110d), a UE 120 or multiple UEs 120 (shown as a UE 120a, a UE 120b, a UE 120c, a UE 120d, and a UE 120e), and/or other entities. A network node 110 is a network node that communicates with UEs 120. As shown, a network node 110 may include one or more network nodes. For example, a network node 110 may be an aggregated network node, meaning that the aggregated network node is configured to utilize a radio protocol stack that is physically or logically integrated within a single radio access network (RAN) node (e.g., within a single device or unit). As another example, a network node 110 may be a disaggregated network node (sometimes referred to as a disaggregated base station), meaning that the network node 110 is configured to utilize a protocol stack that is physically or logically distributed among two or more nodes (such as one or more central units (CUs), one or more distributed units (DUs), or one or more radio units (RUs)).

In some examples, a network node 110 is or includes a network node that communicates with UEs 120 via a radio access link, such as an RU. In some examples, a network node 110 is or includes a network node that communicates with other network nodes 110 via a fronthaul link or a midhaul link, such as a DU. In some examples, a network node 110 is or includes a network node that communicates with other network nodes 110 via a midhaul link or a core network via a backhaul link, such as a CU. In some examples, a network node 110 (such as an aggregated network node 110 or a disaggregated network node 110) may include multiple network nodes, such as one or more RUs, one or more CUs, and/or one or more DUs. A network node 110 may include, for example, an NR base station, an LTE base station, a Node B, an eNB (e.g., in 4G), a gNB (e.g., in 5G), an access point, a transmission reception point (TRP), a DU, an RU, a CU, a mobility element of a network, a core network node, a network element, a network equipment, a RAN node, or a combination thereof. In some examples, the network nodes 110 may be interconnected to one another or to one or more other network nodes 110 in the wireless network 100 through various types of fronthaul, midhaul, and/or backhaul interfaces, such as a direct physical connection, an air interface, or a virtual network, using any suitable transport network.

In some examples, a network node 110 may provide communication coverage for a particular geographic area. In the Third Generation Partnership Project (3GPP), the term "cell" can refer to a coverage area of a network node 110 and/or a network node subsystem serving this coverage area, depending on the context in which the term is used. A network node 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscriptions. A femto cell may cover a relatively small geographic area (e.g., a home) and may allow restricted access by UEs 120 having association with the femto cell (e.g., UEs 120 in a closed subscriber group (CSG)). A network node 110 for a macro cell may be referred to as a macro network node. A network node 110 for a pico cell may be referred to as a pico network node. A network node 110 for a femto cell may be referred to as a femto network node or an in-home network node. In the example shown in FIG. 1, the network node 110a may be a macro network node for a macro cell 102a, the network node 110b may be a pico network node for a pico cell 102b, and the network node 110c may be a femto network node for a femto cell 102c. A network node may support one or multiple (e.g., three) cells. In some examples, a cell may not necessarily be stationary, and the geographic area of the cell may move according to the location of a network node 110 that is mobile (e.g., a mobile network node).

In some aspects, the terms "base station" or "network node" may refer to an aggregated base station, a disaggregated base station, an integrated access and backhaul (IAB) node, a relay node, or one or more components thereof. For example, in some aspects, "base station" or "network node" may refer to a CU, a DU, an RU, a Near-Real Time (Near-RT) RAN Intelligent Controller (RIC), or a Non-Real Time (Non-RT) RIC, or a combination thereof. In some aspects, the terms "base station" or "network node" may refer to one device configured to perform one or more functions, such as those described herein in connection with the network node 110. In some aspects, the terms "base station" or "network node" may refer to a plurality of devices configured to perform the one or more functions. For example, in some distributed systems, each of a quantity of different devices (which may be located in the same geographic location or in different geographic locations) may be configured to perform at least a portion of a function, or to duplicate performance of at least a portion of the function, and the terms "base station" or "network node" may refer to any one or more of those different devices. In some aspects, the terms "base station" or "network node" may refer to one or more virtual base stations or one or more virtual base station functions. For example, in some aspects, two or more base station functions may be instantiated on a single device. In some aspects, the terms "base station" or "network node" may refer to one of the base station functions and not another. In this way, a single device may include more than one base station.

The wireless network 100 may include one or more relay stations. A relay station is a network node that can receive a transmission of data from an upstream node (e.g., a network node 110 or a UE 120) and send a transmission of the data to a downstream node (e.g., a UE 120 or a network node 110). A relay station may be a UE 120 that can relay transmissions for other UEs 120. In the example shown in FIG. 1, the network node 110d (e.g., a relay network node) may communicate with the network node 110a (e.g., a macro network node) and the UE 120d in order to facilitate communication between the network node 110a and the UE 120d. A network node 110 that relays communications may be referred to as a relay station, a relay base station, a relay network node, a relay node, a relay, or the like.

The wireless network 100 may be a heterogeneous network that includes network nodes 110 of different types, such as macro network nodes, pico network nodes, femto network nodes, relay network nodes, or the like. These different types of network nodes 110 may have different transmit power levels, different coverage areas, and/or different impacts on interference in the wireless network 100. For example, macro network nodes may have a high transmit power level (e.g., 5 to 40 watts) whereas pico network nodes, femto network nodes, and relay network nodes may have lower transmit power levels (e.g., 0.1 to 2 watts).

A network controller 130 may couple to or communicate with a set of network nodes 110 and may provide coordination and control for these network nodes 110. The network controller 130 may communicate with the network nodes 110 via a backhaul communication link or a midhaul communication link. The network nodes 110 may communicate with one another directly or indirectly via a wireless or wireline backhaul communication link. In some aspects, the network controller 130 may be a CU or a core network device, or may include a CU or a core network device.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, a UE function of a network node, and/or any other suitable device that is configured to communicate via a wireless or wired medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a network node, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120a and UE 120e) may communicate directly using one or more sidelink channels (e.g., without using a network node 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the network node 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHz, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

In some aspects, the UE 120 may include a communication manager 140. As described in more detail elsewhere herein, the communication manager 140 may transmit a first downlink transmission; receive an uplink transmission that includes CSI including an indication of one or more samples of the first downlink transmission, wherein the one or more samples, before reception of the uplink transmission, are unprocessed for a channel estimation; and transmit a second downlink transmission in accordance with the channel estimation that is based at least in part on the one or more samples. Additionally, or alternatively, the communication manager 140 may perform one or more other operations described herein.

In some aspects, an XR device 145 may include a communication manager 150. As described in more detail elsewhere herein, the communication manager 150 may receive a first downlink transmission; transmit an uplink transmission that includes CSI including an indication of one or more samples of the first downlink transmission, wherein the one or more samples, before transmission of the uplink transmission, are unprocessed for a channel estimation; and receive a second downlink transmission in accordance with the channel estimation that is based at least in part on the one or more samples. Additionally, or alternatively, the communication manager 150 may perform one or more other operations described herein.

As indicated above, FIG. 1 is provided as an example. Other examples may differ from what is described with regard to FIG. 1.

Figure 2:
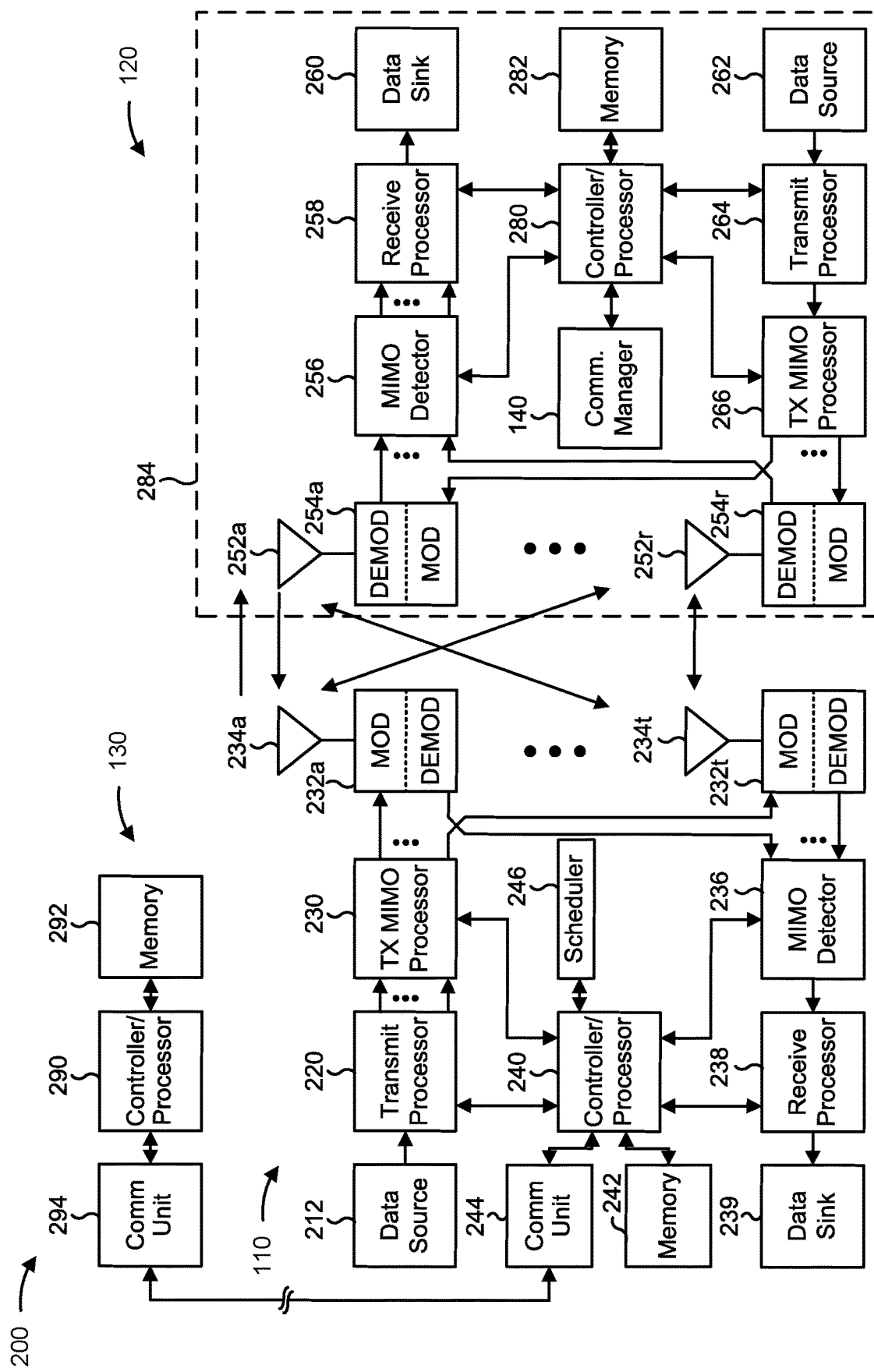
FIG. 2 is a diagram illustrating an example of a network node in communication with a user equipment (UE) in a wireless network, in accordance with the present disclosure.

FIG. 2 is a diagram illustrating an example 200 of a network node 110 in communication with a UE 120 in a wireless network 100, in accordance with the present disclosure. The network node 110 may be equipped with a set of antennas 234a through 234t, such as T antennas (T≥1). The UE 120 may be equipped with a set of antennas 252a through 252r, such as R antennas (R≥1). The network node 110 of example 200 includes one or more radio frequency components, such as antennas 234 and a modem 232. In some examples, a network node 110 may include an interface, a communication component, or another component that facilitates communication with the UE 120 or another network node. Some network nodes 110 may not include radio frequency components that facilitate direct communication with the UE 120, such as one or more CUs, or one or more DUs.

At the network node 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The network node 110 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232a through 232t. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232a through 232t may transmit a set of downlink signals (e.g., T downlink signals) via a corresponding set of antennas 234 (e.g., T antennas), shown as antennas 234a through 234t.

At the UE 120, a set of antennas 252 (shown as antennas 252a through 252r) may receive the downlink signals from the network node 110 and/or other network nodes 110 and may provide a set of received signals (e.g., R received signals) to a set of modems 254 (e.g., R modems), shown as modems 254a through 254r. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the network node 110 via the communication unit 294.

One or more antennas (e.g., antennas 234a through 234t and/or antennas 252a through 252r) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the network node 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 6-12).

At the network node 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The network node 110 may include a communication unit 244 and may communicate with the network controller 130 via the communication unit 244. The network node 110 may include a scheduler 246 to schedule one or more UEs 120 for downlink and/or uplink communications. In some examples, the modem 232 of the network node 110 may include a modulator and a demodulator. In some examples, the network node 110 includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 6-12).

The controller/processor 280 of the UE 120 and/or any other component(s) of FIG. 2 may perform one or more techniques associated with channel estimation based on samples of a downlink transmission, as described in more detail elsewhere herein. For example, the controller/processor 280 of the UE 120 and/or any other component(s) of FIG. 2 may perform or direct operations of, for example, process 900 of FIG. 9, process 1000 of FIG. 10, and/or other processes as described herein. The memory 242 and the memory 282 may store data and program codes for the UE 120. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the UE 120, may cause the one or more processors and/or the UE 120 to perform or direct operations of, for example, process 900 of FIG. 9, process 1000 of FIG. 10, and/or other processes as described herein. In some examples, executing instructions may include running the instructions, converting the instructions, compiling the instructions, and/or interpreting the instructions, among other examples.

In some aspects, the UE 120 includes means for transmitting a first downlink transmission; means for receiving an uplink transmission that includes CSI including an indication of one or more samples of the first downlink transmission, wherein the one or more samples, before reception of the uplink transmission, are unprocessed for a channel estimation; and/or means for transmitting a second downlink transmission in accordance with the channel estimation that is based at least in part on the one or more samples. The means for the UE to perform operations described herein may include, for example, one or more of communication manager 140, antenna 252, modem 254, MIMO detector 256, receive processor 258, transmit processor 264, TX MIMO processor 266, controller/processor 280, or memory 282.

In some aspects, the XR device 145 includes means for receiving a first downlink transmission; means for transmitting an uplink transmission that includes CSI including an indication of one or more samples of the first downlink transmission, wherein the one or more samples, before transmission of the uplink transmission, are unprocessed for a channel estimation; and/or means for receiving a second downlink transmission in accordance with the channel estimation that is based at least in part on the one or more samples. The means for the XR device 145 to perform operations described herein may include, for example, one or more of communication manager 150.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Deployment of communication systems, such as 5G NR systems, may be arranged in multiple manners with various components or constituent parts. In a 5G NR system, or network, a network node, a network entity, a mobility element of a network, a RAN node, a core network node, a network element, a base station, or a network equipment may be implemented in an aggregated or disaggregated architecture. For example, a base station (such as a Node B (NB), an evolved NB (eNB), an NR base station, a 5G NB, an access point (AP), a TRP, or a cell, among other examples), or one or more units (or one or more components) performing base station functionality, may be implemented as an aggregated base station (also known as a standalone base station or a monolithic base station) or a disaggregated base station. "Network entity" or "network node" may refer to a disaggregated base station, or to one or more units of a disaggregated base station (such as one or more CUs, one or more DUs, one or more RUs, or a combination thereof).

An aggregated base station (e.g., an aggregated network node) may be configured to utilize a radio protocol stack that is physically or logically integrated within a single RAN node (e.g., within a single device or unit). A disaggregated base station (e.g., a disaggregated network node) may be configured to utilize a protocol stack that is physically or logically distributed among two or more units (such as one or more CUs, one or more DUs, or one or more RUs). In some examples, a CU may be implemented within a network node, and one or more DUs may be co-located with the CU, or alternatively, may be geographically or virtually distributed throughout one or multiple other network nodes. The DUs may be implemented to communicate with one or more RUs. Each of the CU, DU, and RU also can be implemented as virtual units, such as a virtual central unit (VCU), a virtual distributed unit (VDU), or a virtual radio unit (VRU), among other examples.

Base station-type operation or network design may consider aggregation characteristics of base station functionality. For example, disaggregated base stations may be utilized in an IAB network, an open radio access network (O-RAN (such as the network configuration sponsored by the O-RAN Alliance)), or a virtualized radio access network (vRAN, also known as a cloud radio access network (C-RAN)) to facilitate scaling of communication systems by separating base station functionality into one or more units that can be individually deployed. A disaggregated base station may include functionality implemented across two or more units at various physical locations, as well as functionality implemented for at least one unit virtually, which can enable flexibility in network design. The various units of the disaggregated base station can be configured for wired or wireless communication with at least one other unit of the disaggregated base station.

Figure 3:
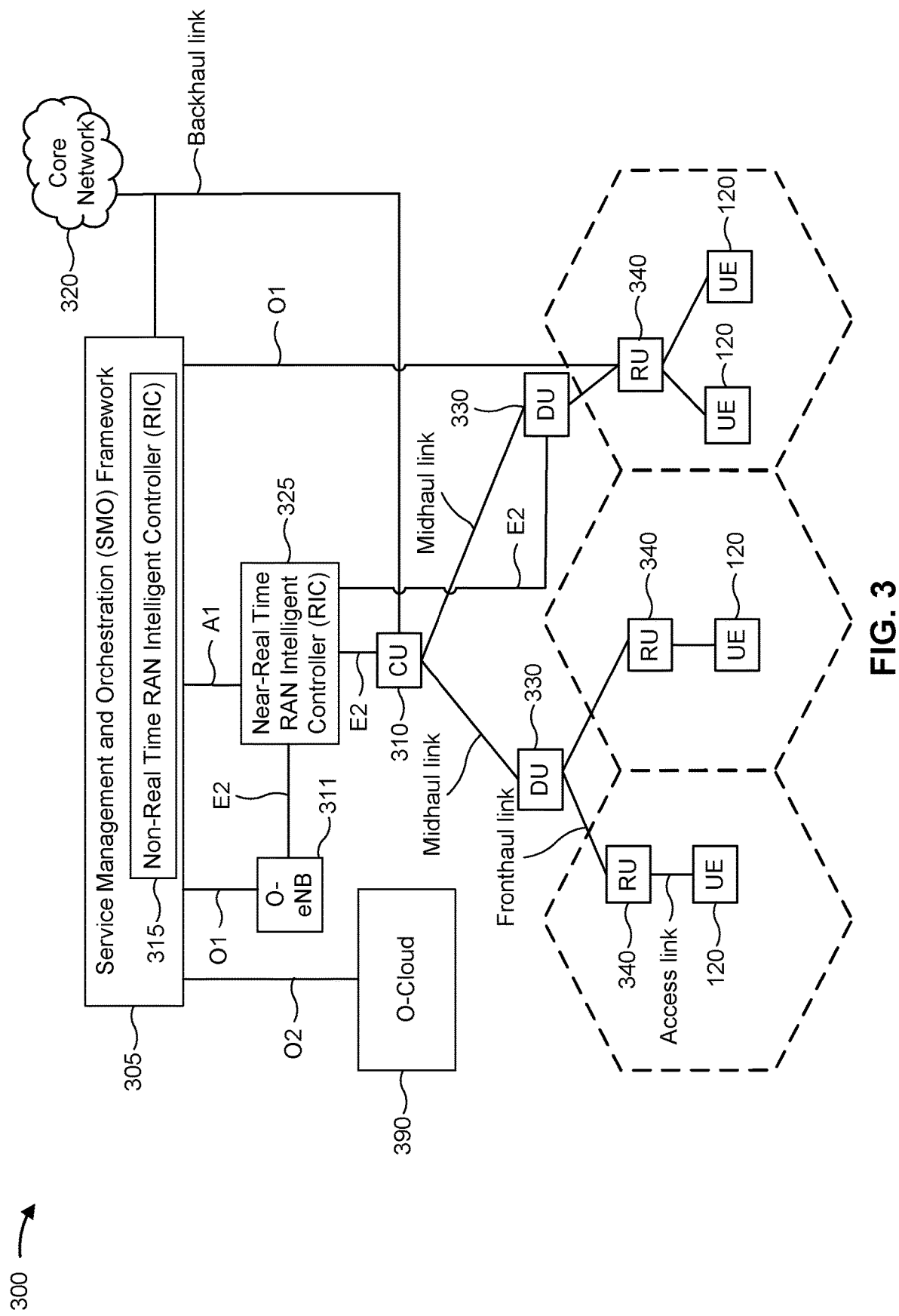
FIG. 3 is a diagram illustrating an example disaggregated base station architecture, in accordance with the present disclosure.

FIG. 3 is a diagram illustrating an example disaggregated base station architecture 300, in accordance with the present disclosure. The disaggregated base station architecture 300 may include a CU 310 that can communicate directly with a core network 320 via a backhaul link, or indirectly with the core network 320 through one or more disaggregated control units (such as a Near-RT RIC 325 via an E2 link, or a Non-RT RIC 315 associated with a Service Management and Orchestration (SMO) Framework 305, or both). A CU 310 may communicate with one or more DUs 330 via respective midhaul links, such as through F1 interfaces. Each of the DUs 330 may communicate with one or more RUs 340 via respective fronthaul links. Each of the RUs 340 may communicate with one or more UEs 120 via respective radio frequency (RF) access links. In some implementations, a UE 120 may be simultaneously served by multiple RUs 340.

Each of the units, including the CUs 310, the DUs 330, the RUs 340, as well as the Near-RT RICs 325, the Non-RT RICs 315, and the SMO Framework 305, may include one or more interfaces or be coupled with one or more interfaces configured to receive or transmit signals, data, or information (collectively, signals) via a wired or wireless transmission medium. Each of the units, or an associated processor or controller providing instructions to one or multiple communication interfaces of the respective unit, can be configured to communicate with one or more of the other units via the transmission medium. In some examples, each of the units can include a wired interface, configured to receive or transmit signals over a wired transmission medium to one or more of the other units, and a wireless interface, which may include a receiver, a transmitter or transceiver (such as an RF transceiver), configured to receive or transmit signals, or both, over a wireless transmission medium to one or more of the other units.

In some aspects, the CU 310 may host one or more higher layer control functions. Such control functions can include radio resource control (RRC) functions, packet data convergence protocol (PDCP) functions, or service data adaptation protocol (SDAP) functions, among other examples. Each control function can be implemented with an interface configured to communicate signals with other control functions hosted by the CU 310. The CU 310 may be configured to handle user plane functionality (for example, Central Unit-User Plane (CU-UP) functionality), control plane functionality (for example, Central Unit-Control Plane (CU-CP) functionality), or a combination thereof. In some implementations, the CU 310 can be logically split into one or more CU-UP units and one or more CU-CP units. A CU-UP unit can communicate bidirectionally with a CU-CP unit via an interface, such as the E1 interface when implemented in an O-RAN configuration. The CU 310 can be implemented to communicate with a DU 330, as necessary, for network control and signaling.

Each DU 330 may correspond to a logical unit that includes one or more base station functions to control the operation of one or more RUs 340. In some aspects, the DU 330 may host one or more of a radio link control (RLC) layer, a medium access control (MAC) layer, and one or more high physical (PHY) layers depending, at least in part, on a functional split, such as a functional split defined by the 3GPP. In some aspects, the one or more high PHY layers may be implemented by one or more modules for forward error correction (FEC) encoding and decoding, scrambling, and modulation and demodulation, among other examples. In some aspects, the DU 330 may further host one or more low PHY layers, such as implemented by one or more modules for a fast Fourier transform (FFT), an inverse FFT (iFFT), digital beamforming, or physical random access channel (PRACH) extraction and filtering, among other examples. Each layer (which also may be referred to as a module) can be implemented with an interface configured to communicate signals with other layers (and modules) hosted by the DU 330, or with the control functions hosted by the CU 310.

Each RU 340 may implement lower-layer functionality. In some deployments, an RU 340, controlled by a DU 330, may correspond to a logical node that hosts RF processing functions or low-PHY layer functions, such as performing an FFT, performing an iFFT, digital beamforming, or PRACH extraction and filtering, among other examples, based on a functional split (for example, a functional split defined by the 3GPP), such as a lower layer functional split. In such an architecture, each RU 340 can be operated to handle over the air (OTA) communication with one or more UEs 120. In some implementations, real-time and non-real-time aspects of control and user plane communication with the RU(s) 340 can be controlled by the corresponding DU 330. In some scenarios, this configuration can enable each DU 330 and the CU 310 to be implemented in a cloud-based RAN architecture, such as a vRAN architecture.

The SMO Framework 305 may be configured to support RAN deployment and provisioning of non-virtualized and virtualized network elements. For non-virtualized network elements, the SMO Framework 305 may be configured to support the deployment of dedicated physical resources for RAN coverage requirements, which may be managed via an operations and maintenance interface (such as an O1 interface). For virtualized network elements, the SMO Framework 305 may be configured to interact with a cloud computing platform (such as an open cloud (O-Cloud) platform 390) to perform network element life cycle management (such as to instantiate virtualized network elements) via a cloud computing platform interface (such as an O2 interface). Such virtualized network elements can include, but are not limited to, CUs 310, DUs 330, RUs 340, non-RT RICs 315, and Near-RT RICs 325. In some implementations, the SMO Framework 305 can communicate with a hardware aspect of a 4G RAN, such as an open eNB (O-eNB) 311, via an O1 interface. Additionally, in some implementations, the SMO Framework 305 can communicate directly with each of one or more RUs 340 via a respective O1 interface. The SMO Framework 305 also may include a Non-RT RIC 315 configured to support functionality of the SMO Framework 305.

The Non-RT RIC 315 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 325. The Non-RT RIC 315 may be coupled to or communicate with (such as via an A1 interface) the Near-RT RIC 325. The Near-RT RIC 325 may be configured to include a logical function that enables near-real-time control and optimization of RAN elements and resources via data collection and actions over an interface (such as via an E2 interface) connecting one or more CUs 310, one or more DUs 330, or both, as well as an O-eNB, with the Near-RT RIC 325.

In some implementations, to generate AI/ML models to be deployed in the Near-RT RIC 325, the Non-RT RIC 315 may receive parameters or external enrichment information from external servers. Such information may be utilized by the Near-RT RIC 325 and may be received at the SMO Framework 305 or the Non-RT RIC 315 from non-network data sources or from network functions. In some examples, the Non-RT RIC 315 or the Near-RT RIC 325 may be configured to tune RAN behavior or performance. For example, the Non-RT RIC 315 may monitor long-term trends and patterns for performance and employ AI/ML models to perform corrective actions through the SMO Framework 305 (such as reconfiguration via an O1 interface) or via creation of RAN management policies (such as A1 interface policies).

As indicated above, FIG. 3 is provided as an example. Other examples may differ from what is described with regard to FIG. 3.

"XR" is an umbrella term that covers immersive technologies such as virtual reality (VR), augmented reality (AR), mixed reality (MR), and levels of virtuality interpolated among VR, AR, and MR. An XR device, such as an XR wearable device (e.g., glasses, goggles, etc.), may offer XR services or XR applications. For example, an XR device may provide rendered data (e.g., video data or XR data) via a display of the XR device.

However, XR services (e.g., rendering data in real-time) may involve heavy batteries, high-complexity processing, and/or large power consumption. Heavy batteries may cause the XR device to be uncomfortable for a user (e.g., a wearer of an XR wearable device), and high-complexity processing and large power consumption may generate a level of heat that is uncomfortable or dangerous for the user. For example, XR devices may have limited heat dissipation ability because heat dissipation ability is proportional to the surface sizes (e.g., surface areas) of XR devices. XR glasses, for example, may have a lower heat dissipation ability than a UE (e.g., a smartphone) because the XR glasses may have a surface size that is smaller than that of the UE.

Standalone XR devices may be unable to comply with "on-the-go" requirements, such as lightweight batteries, limited processing complexity, and/or low power consumption. For example, standalone XR glasses may be heavier than traditional glasses (e.g., 30-40 grams). Furthermore, XR glasses may exceed a power consumption limit (e.g., 1.5-3 Watts) for heat dissipation purposes. As a result, standalone XR devices may be relevant for limited applications or static or short-time usage scenarios, such as those involving a higher form-factor head-mounted device (HMD). For most applications/scenarios, use of a high form-factor HMD is inconvenient or impractical.

The 3GPP assumes a split XR approach, which may reduce complexity on an XR device. Under a first XR split approach, a portion of XR-related processing may be shifted to a companion device. The first split XR approach may involve moving most rendering-related processing to a companion device. However, due to end-to-end networking considerations (e.g., photon-to-motion latency requirement, XR device to companion device wireless link capacity, communication link power consumption for long range links, or the like), many processing components remain on the XR device under the first split XR approach.

Therefore, under the first split XR approach, power consumption on an XR device is reduced, but the power consumption is still too high for even low-demand video quality or user experience benchmarks and for low-demand applications. As a result, the first XR split approach may not resolve the aforementioned technology-limiting factors (e.g., heavy batteries, high-complexity processing, and/or large power consumption). Thus, the first XR split approach may be unable to support high-demand, premium XR applications (e.g., for fps≥120 Hz, video formats ≥8 k, or the like).

For example, the first split XR approach may use long-range communication links over the licensed spectrum with tight scheduling and staggering among different served XR users. Due to limited link capacity per user, to reduce uplink data volume, the XR device may employ sensor data pre-processing (e.g., six-degree-of-freedom tracking, eye tracking for field of view derivation, or the like) locally. The XR device may also locally compress additional critical sensor (e.g., camera) data from the XR device (e.g., uplink data) and rendered video for the XR device (e.g., downlink data) with a high compression factor. Local (e.g., on the XR device) sensor data pre-processing and video compression with a high compression factor (e.g., via High profile) may have a correspondingly high complexity, especially for the encoder side. For example, the pre-processing may involve extensive use of double data rate (DDR) memory—a heavy power consumer—for both transmission path video processing and reception path video processing. Due to photon-to-motion latency requirements and gNB-based split related latencies, receiver-side processing on the XR device may also involve asynchronous time wrapping (ATW) for last-moment image alignment with the latest pose information. These various processing and pre-processing operations in the first XR split scenario may cause XR device power consumption to exceed a target power consumption threshold for lightweight small form factor XR devices, such as XR wearable smart glasses.

Figure 4:
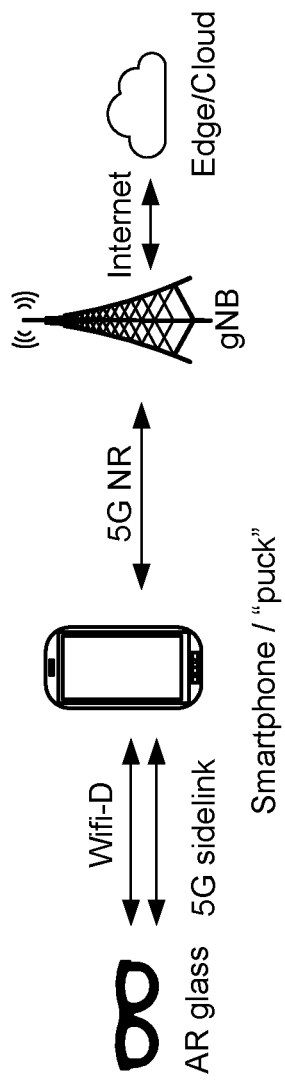
FIG. 4 is a diagram illustrating an example associated with an extended reality (XR) split approach, in accordance with the present disclosure.

FIG. 4 is a diagram illustrating an example 400 associated with a second XR split approach, in accordance with the present disclosure. The second XR split approach may involve offloading processing operations via tethering to a relatively close companion device (e.g., a UE) or splitting processing between an XR device, a companion UE, and a gNB. Unlike the first XR split approach, the second XR split approach may involve a local short range communication link with the associated UE (e.g., via a 5G NR sidelink or Wi-Fi). The second XR split approach may reduce modem-related power consumption but may involve a processing load and locally covered functionality on the XR device that is similar to the first XR split approach.

As indicated above, FIG. 4 is provided as an example. Other examples may differ from what is described with respect to FIG. 4.

Figure 5:
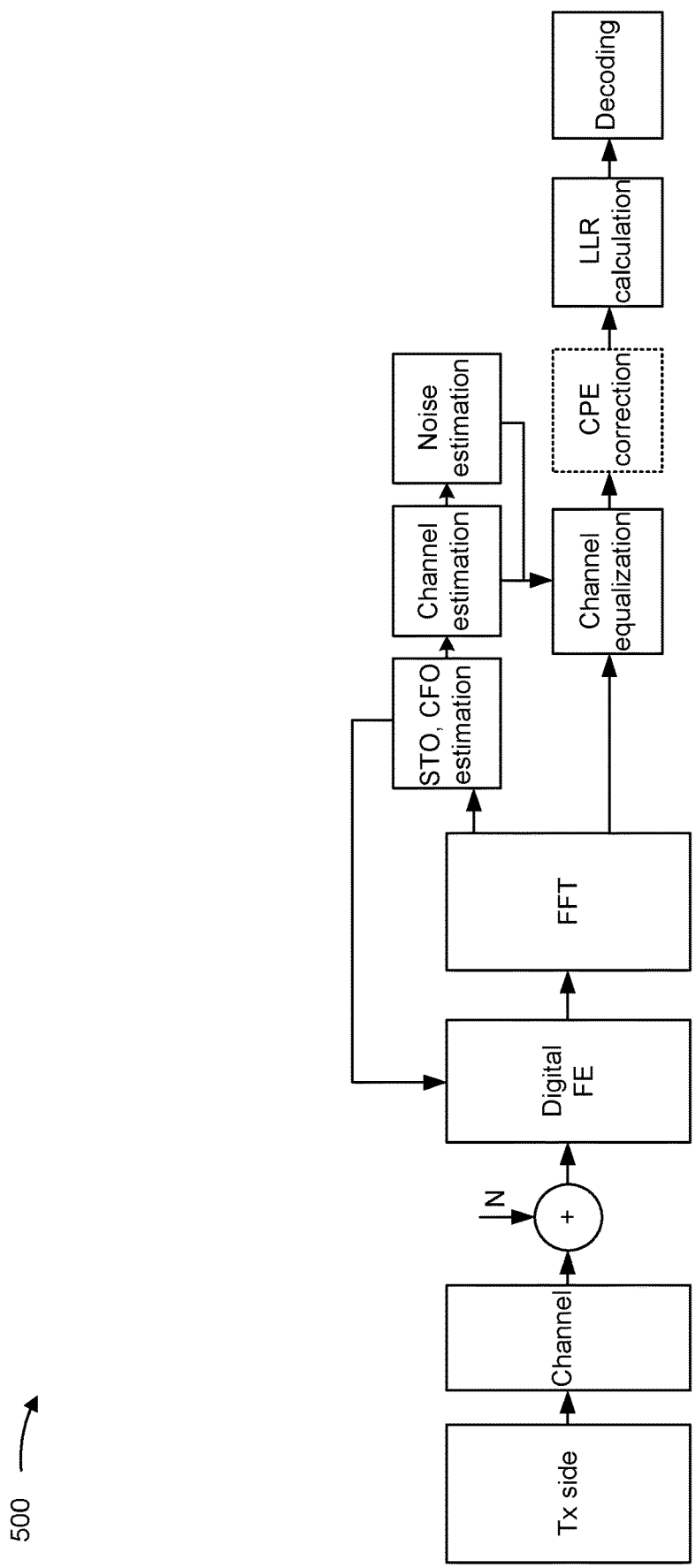
FIG. 5 is a diagram illustrating an example associated with a typical physical (PHY) reception architecture, in accordance with the present disclosure.

FIG. 5 is a diagram illustrating an example 500 associated with a typical PHY reception (Rx) architecture, in accordance with the present disclosure. As shown, a signal is transmitted from the Tx side, over a channel where noise is introduced, to the Rx side. At the Rx side, the signal enters a digital front-end (FE) circuit, and the XR device may perform various processing operations on the signal, such as fast Fourier transform (FFT), symbol timing offset (STO) and carrier frequency offset (CFO) estimation, channel estimation, noise estimation, channel equalization, common phase error (CPE) correction, log likelihood ratio (LLR) calculation, and decoding. As shown, most modem complexity is typically associated with Rx side (e.g., XR device side) processing.

As indicated above, FIG. 5 is provided as an example. Other examples may differ from what is described with respect to FIG. 5.

Under a third XR split approach, various Rx PHY modules shown in FIG. 5 may be effectively shifted (e.g., degenerated) from the Rx side of the link to the transmission (Tx) side (e.g., to the UE side) such that only limited processing is performed on the XR modem side. In the third XR split approach, most Rx baseband processing related complexity may be shifted to the Tx side, which may enable significant reduction in Rx (e.g., XR device) modem complexity and power consumption.

The third XR split approach may involve offloading processing operations from the XR device to a companion device (e.g., to a UE, or a UE and a gNB) more aggressively than in the first and second XR split approaches. For example, under the third XR split approach, an XR device may approximate an input/output (I/O) device that shares all local sensor information with the UE (e.g., without any pre-processing), and obtains from the UE rendered video to be displayed directly (e.g., without any post-processing). Unlike the first and second XR split approaches, the third XR split approach may provide XR characteristics and key performance indicators (KPIs) that are sufficiently low-power and lightweight so as to enable an "on-the-go" XR device (e.g., a wearable XR product).

When employing an aggressive XR functionality split under the third XR split approach, high-complexity XR device Tx and Rx operations may be shifted from the XR device to the companion device (e.g., UE). For example, some or all functional components of the XR device, including high-complexity PHY/modem related-components, may be moved to the UE. In the third XR split approach, uplink and downlink channels may be effectively continuous (e.g., having low-latency time division duplex (TDD), single frequency full duplex (SFFD), or sub-band full duplex (SBFD)/frequency division duplex (FDD) patterns).

The third XR split approach may reduce XR device power consumption significantly (e.g., by approximately 50%) compared to the first or second XR split approaches. Thus, the third XR split approach may provide low complexity, low power, low-latency XR sidelink design and waveform, or the like.

In some examples, the third split XR approach may shift channel equalization—which may be a key contributor to complexity at the modem—from the XR device to the UE. For example, the UE (rather than the XR device) may perform Rx channel equalization. For example, instead of performing the Rx equalization on the XR device side, a Tx pre-equalizer (e.g., a Tx precoder) may be applied on the companion device (e.g., UE) side. For example, Tx pre-equalization may involve derivation of pre-equalization matrices. Shifting the equalization complexity from the receiver to the transmitter may result in complexity reduction (e.g., removal or elimination) on the XR device modem side for Rx equalization.

Channel equalization may be based on CSI. For example, to perform Tx pre-equalization, the UE may require CSI associated with the link from the UE to the XR device (e.g., downlink CSI). In scenarios where channel reciprocity holds (such as low latency TDD pattern or full duplex scenarios), CSI for the UE-to-XR link (e.g., the downlink) may be obtained via channel estimation on the UE side based on uplink reference signals (RSs). However, when reciprocity does not hold, the uplink RSs may not be applied to downlink communications. The UE may perform Tx pre-equalization based on CSI reported to the UE by the XR device, but XR device side calculation of CSI may be a high-complexity process.

Figure 6:
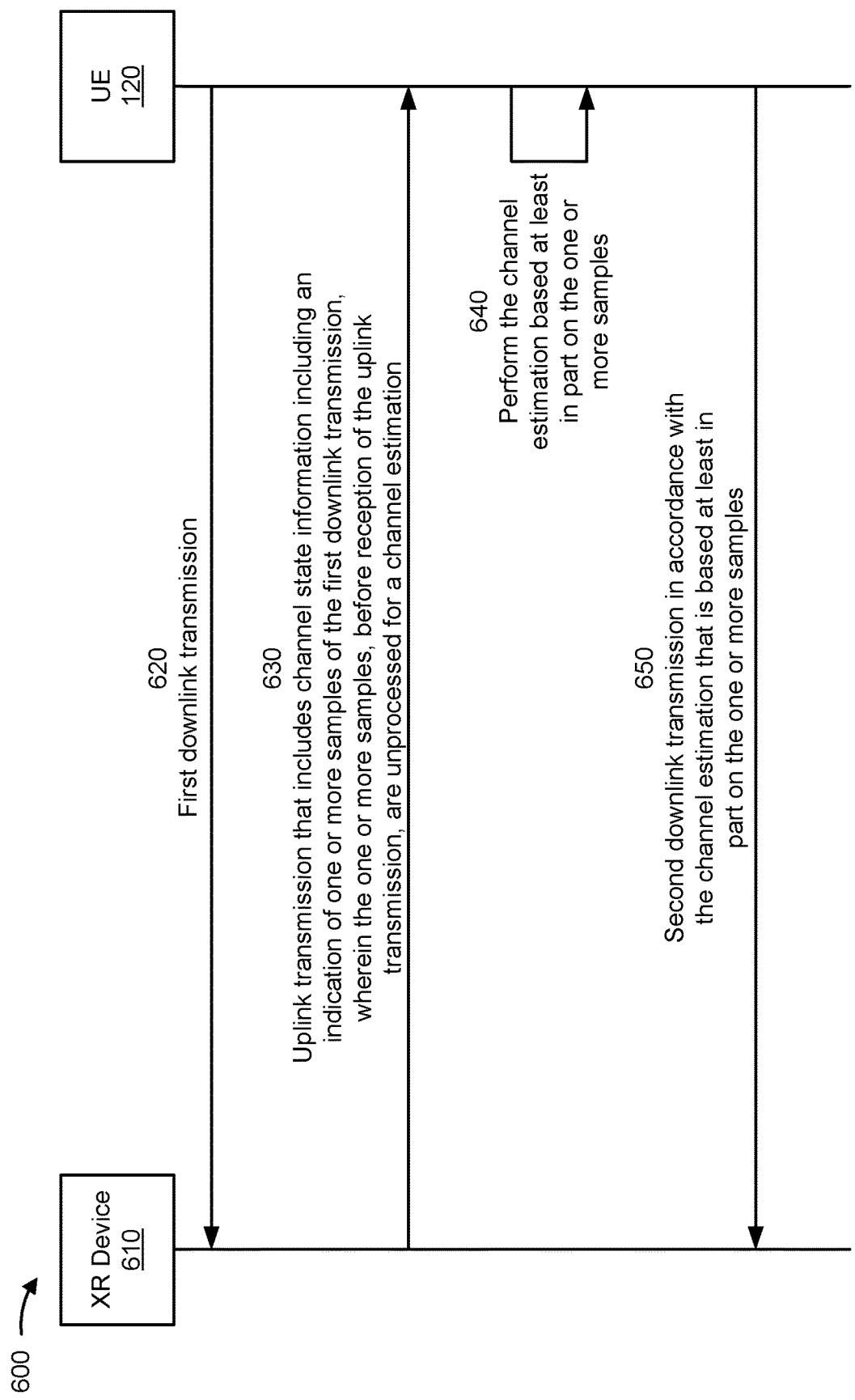
FIG. 6 is a diagram of an example associated with channel estimation based on samples of a downlink transmission, in accordance with the present disclosure.

FIG. 6 is a diagram of an example 600 associated with channel estimation based on samples of a downlink transmission, in accordance with the present disclosure. As shown in FIG. 6, an XR device 610 (e.g., XR device 145) may communicate with a UE (e.g., UE 120). The XR device 610 and the UE 120 may have established a wireless connection (e.g., a sidelink connection) prior to operations shown in FIG. 6. Any suitable transmission scheme may be employed on the sidelink connection. The wireless connection may involve static (or nearly static) channels/links (as in the case of short range XR device-to-UE links) and low latency feedback (as in SBFD, FDD, and low-latency TDD patterns). A full duplex scheme may be implemented to support a low-power short-range link for a sidelink connection over ultra-wideband (UWB).

As shown by reference number 620, the UE 120 may transmit, and the XR device 610 may receive, a first downlink transmission. The first downlink transmission may be carried by a downlink channel. As used herein, "downlink" may refer to a UE-to-XR device link.

As shown by reference number 630, the UE 120 may receive, and the XR device 610 may transmit, an uplink transmission that includes CSI (e.g., a CSI report, such as a partial CSI report). The CSI includes an indication of one or more samples of the first downlink transmission. As used herein, "uplink" may refer to an XR device-to-UE link. For example, the one or more samples may include one or more of the RSs or one or more of the data samples. The one or more samples, before transmission (by the XR device 610) or reception (by the UE 120) of the uplink transmission, may be unprocessed for a channel estimation. For example, the XR device may refrain from extracting channel-related information from the samples before retransmitting the samples for channel estimation. The channel estimation may be of a downlink channel that carries the first downlink transmission.

As shown by reference number 640, the UE 120 may perform the channel estimation based at least in part on the one or more samples. For example, the UE 120 may estimate the downlink channel (e.g., determine downlink CSI) by analyzing the one or more samples of the first downlink transmission as the one or more samples were received at the XR device 610. Thus, the XR device 610 may sample and re-transmit the first downlink transmission from the UE 120 with minimal and low-complexity processing without performing the channel estimation. For example, the UE 120 may obtain the downlink CSI with reduced XR device side complexity by shifting the downlink channel estimation process from the XR device 610 to the UE 120. The first downlink transmission may be processed by the UE to estimate DL CSI (channel estimation is shifted from the XR Rx side to its companion device). This may help the XR device 610 to approximate an I/O device, consistent with the third XR split approach described above.

As shown by reference number 650, the UE 120 may transmit, and the XR device 610 may receive, a second downlink transmission (e.g., via the downlink channel) in accordance with the channel estimation that is based at least in part on the one or more samples. For example, the UE 120 may pre-equalize the second downlink transmission so as to compensate for channel effects (e.g., scattering, fading, power decay, or the like) on the second downlink transmission. As a result, instead of the XR device 610 performing the high-complexity task of channel equalization for the downlink channel, the UE 120 may perform channel pre-equalization. This may help the XR device 610 to approximate an I/O device, consistent with the third XR split approach described above.

The downlink channel that carries the first downlink transmission and the second downlink transmission may or may not be reciprocal with the uplink channel that carries the uplink transmission. A downlink channel is reciprocal if a transmitter can estimate the downlink channel based on uplink communications. CSI acquisition for Tx pre-equalization may be duplex-dependent and may be based at least in part on channel reciprocity criteria. Implementations described herein may help to enable quasi-continuous CSI for the downlink channel with or without channel reciprocity.

If the downlink channel is not reciprocal, then the UE 120 cannot perform the channel estimation based on, for example, the first uplink communications. Channel reciprocity cannot be assumed in SBFD or FDD scenarios. In such cases, the XR device 610 may indicate (e.g., signal) CSI-related information (e.g., at least a partial CSI report) to the UE 120. The UE 120 may obtain the CSI efficiently and with low-complexity operations performed by the XR device

610. For example, channel estimation operations may be distributed between the Rx side and the Tx side (e.g., for FDD or SBFD scenarios), with the Rx side performing channel sampling and indicating the samples to the Tx side. For example, as shown by reference number 630, the XR device 610 may indicate raw Rx samples (e.g., signal samples or channel samples) to the UE 120, thereby enabling the UE 120 to run the downlink channel and noise estimation procedures locally instead of at the XR device 610, even when reciprocity does not hold.

The downlink channel may be reciprocal in full duplex (e.g., SFFD) or TDD transmission schemes. In such scenarios, while the channel estimation may be moved entirely to the Tx side (e.g., may be performed entirely by the UE 120 based on uplink RSs without CSI-related signaling from the XR device 610), transmitting the uplink transmission as shown at reference number 630 may enable the UE 120 to capture a noise estimation (e.g., XR device noise, residual channel estimation error components, or the like) that would not be available using channel estimation based on uplink RSs.

For example, the UE 120 may estimate noise based at least in part on the one or more samples. Thus, even in scenarios where channel reciprocity holds (and, therefore, the UE 120 may perform channel estimation based on uplink RSs), estimating the noise may enable the UE 120 to capture XR device side noise estimation (e.g., minimum mean square error (MMSE) criterion based noise reduction) and a residual channel estimation error component. The UE 120 may use the noise estimation to perform transmission pre-equalization based on Rx noise statistics information (e.g., Rnn) on the Tx/UE side. UE 120 estimating the noise (e.g., Rx side noise statistics information, such as Rnn) may reduce signaling overhead and/or reduce the processing performed at the XR device 610 by enabling the XR device 610 to avoid signaling the noise information to the UE 120.

As noted, the first downlink transmission may include RSs or data, and the one or more samples indicated in the CSI may be one or more RS samples (e.g., downlink RS samples) or one or more data samples. Sampling RSs may enable the UE 120 to perform the channel estimation because the RSs are known to the UE 120. In the case where the one or more samples are data samples, the UE 120 may use the data samples as pilot signals for the channel estimation because the data may be known to the UE 120 (e.g., because the UE 120 transmitted the data to the XR device 610). Sampling data may reduce overhead because the UE 120 may avoid transmitting additional signaling for the pre-equalization channel estimation.

The one or more samples may be sampled in a time domain or in a frequency domain. For example, the XR device 610 may sample the first downlink transmission to obtain the raw time domain samples corresponding to the pilot transmission, which may enable the UE 120 (instead of the XR device 610) to perform the channel estimation. In the case of an OFDM waveform, the one or more samples may be frequency domain samples over a frequency domain grid. If sampling occurs in the frequency domain, then the XR device 610 may sample the downlink transmission at a rate that is lower than a rate at which a plurality of samples are transmitted in the first downlink transmission. The sampling decimation may depend on the physical resource block group (PRG) definitions for transmission pre-equalization from the UE side (e.g., a configured number of channel samples per PRG). Sampling at the lower rate may achieve a reduction in uplink signaling volume.

In some examples, the one or more samples may be encoded in the uplink transmission via a first MCS that is lower than a second MCS of another uplink transmission. The other uplink transmission may include uplink data determined via link adaptation. For instance, setting a lower MCS may involve setting a lower code rate (CR), a lower modulation order, or the like. Encoding the uplink transmission (e.g., for the channel code used by the XR device) via the first MCS that is lower than the second MCS may add robustness to the CSI indicated by the XR device (e.g., a partial CSI report). For example, if the uplink transmission is carried via UWB, then the uplink transmission may be subject to unknown or unpredictable interference, because the UWB is unmanaged. Encoding the uplink transmission via the first MCS may help to address (e.g., avoid) interference that may take place over the UWB on the uplink slot where CSI is to be provided.

In some examples, transmitting or receiving the uplink transmission as shown by reference number 630 may include transmitting or receiving the uplink transmission at an uplink occasion that occurs at least a period of time after a downlink occasion that carries the first downlink transmission. For example, the CSI resources transmitted over the uplink may be preconfigured and coupled to the downlink resources that are used for channel sampling (e.g., the downlink RS or data and the uplink CSI resources may be configured to be coupled to each other). Thus, the period of time may be determined based on an uplink slot or symbol relationship with the downlink transmission (e.g., downlink RS or data). The quantity of samples (and the quantized representation of the samples) may be configured and aligned with the allocated resources in uplink for the CSI indication. Thus, the period of time may be determined such that the UE 120 is able to identify the uplink transmission as shown by reference number 630 (e.g., including the indication of the one or more samples) as corresponding to the first downlink transmission (e.g., including the RSs or data), which may enable the UE 120 to perform the channel estimation accurately.

The period of time may be a minimum period of time involved in transmission of the uplink transmission after reception of the first downlink transmission. For example, the XR device 610 may report, in a capability report provided to the UE 120, the minimum period of time (e.g., a minimum time offset involved in the XR device 610 preparing the CSI report transmission). For example, the minimum period of time may be one or more symbols. In some instances, the UE 120 may determine which uplink resource(s) are to carry the indication of the one or more samples according to a rule (e.g., selected depending on the duplexing option) indicating that the uplink occasion on which the indication of the one or more samples are transmitted may not occur before the minimum period of time indicated by XR device 610. The minimum period of time may help to ensure that the XR device 610 has sufficient time to successfully sample the first downlink transmission (as shown by reference number 620) and transmit the indication of the sample(s) (as shown by reference number 630).

In some examples, the first downlink transmission may occur, at least in part, at a last symbol of a first slot, and the uplink occasion may occur on a second slot that is successive to the first slot. For example, the XR device 610 may receive the downlink transmission data/RS samples from the UE 120 and transmit the indication of the samples on a nearest uplink occasion (e.g., a nearest uplink occasion outside the minimum period of time from the time at which the downlink transmission is received). For example, the downlink symbol containing the RS or data may be the last symbol of a downlink slot that is followed by an uplink slot (e.g., in case of low-latency TDD). In this case, the XR device 610 may report the CSI on the next slot after the downlink slot on some predefined symbol indexes (e.g., time resources and/or frequency resources). In some examples, a predefined, nearest-occasion rule may enforce minimum latency between the sampling and the corresponding CSI indication. The first downlink transmission occurring at the last symbol of the first slot and the uplink occasion occurring on the second slot, which is successive to the first slot, may reduce latency. For example, the CSI report may be coupled to the downlink transmission so as to minimize latency.

As indicated above, FIG. 6 is provided as an example. Other examples may differ from what is described with respect to FIG. 6.

Figure 7:
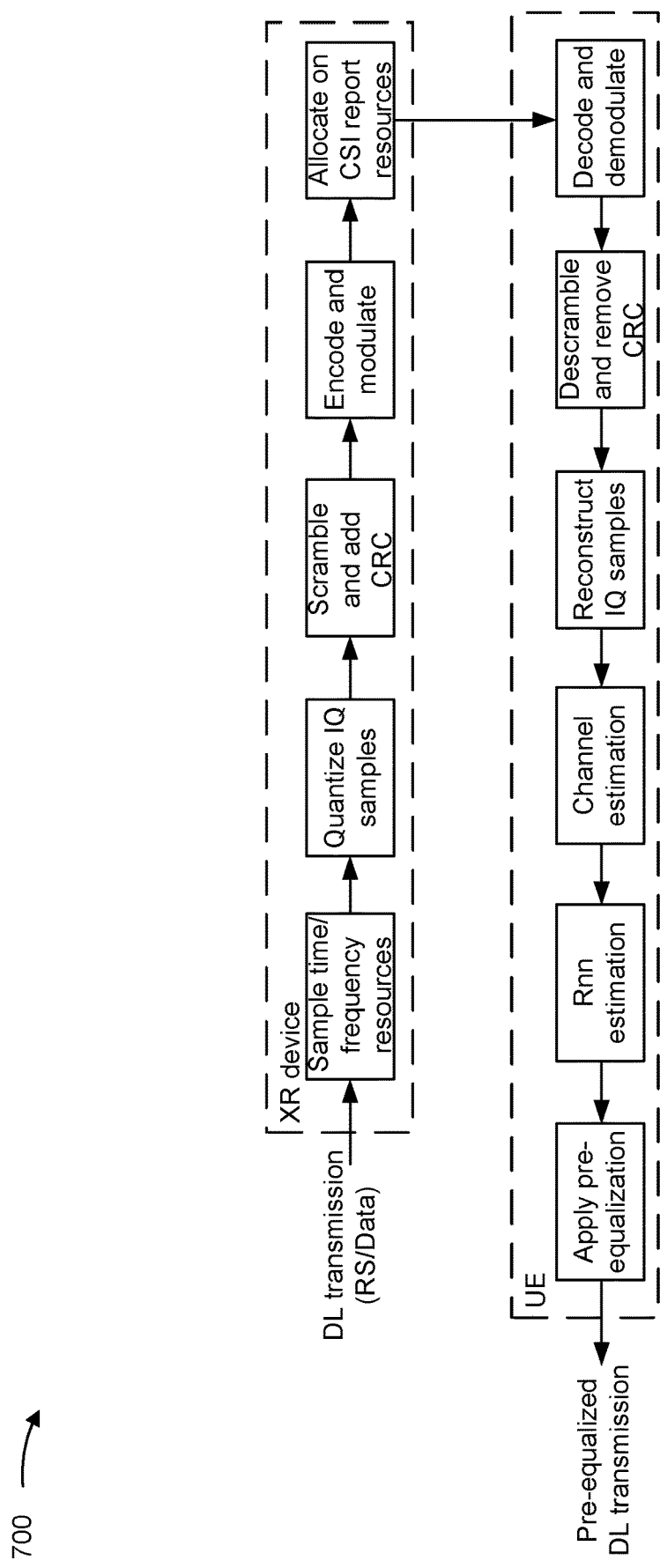
FIG. 7 is a diagram of an example associated with processing operations performed by the XR device and the UE, in accordance with the present disclosure.

FIG. 7 is a diagram of an example 700 associated with processing operations performed by the XR device 610 and the UE 120, in accordance with the present disclosure. As shown, the XR device 610 may receive the downlink transmission containing RSs or data and sample time and/or frequency resources of the downlink transmission. The XR device 610 may quantize the samples (e.g., IQ samples) to generate the CSI, scramble the CSI, add cyclic redundancy check (CRC) bits to the CSI, encode the CSI (e.g., using FEC code), modulate the CSI (e.g., using quadrature amplitude modulation (QAM)), and allocate the CSI on the resources configured for CSI reporting/indication.

The XR device 610 may transmit, and the UE 120 may receive, the CSI report (e.g., containing the indication of the raw samples). The UE 120 may decode the CSI, demodulate the CSI, descramble the CSI, remove CRC bits of the CSI, and reconstruct the samples (e.g., the IQ samples). In some examples, extracting the raw samples (e.g., the IQ samples) may include descrambling and partitioning the bit stream into binary words representing the samples.

If the CSI passes the CRC, then the UE 120 may process the samples by decoding the uplink transmission and performing a channel estimation on the raw samples extracted after the decoding. The channel estimation may capture the channel estimation error for the downlink channel. Channel estimation may include RS pattern removal, time domain and/or frequency domain sample filtering, interpolation in time (e.g., in case more than one downlink RS was sampled and indicated by the XR device 610), interpolation in frequency (e.g., in case of frequency domain based channel sampling and estimation over a sparse grid), and noise estimation. The channel estimation may also include residual STO and CFO estimation and removal coupled to the corresponding STO and CFO correction signaling to the XR device 610 for the next downlink transmission pre-equalized slot.

The UE 120 may also perform noise estimation (e.g., Rnn estimation). The noise estimation may capture the XR side thermal noise. The UE 120 may apply pre-equalization (based on the channel estimation) on the next downlink transmission and transmit the pre-equalized downlink transmission to the XR device 610.

The processing operations shown in FIG. 7 may enable the XR device 610 to perform relatively low-complexity operations (e.g., the processing operations performed by XR device 610 as shown in FIG. 7). For example, the XR device 610 may avoid performing a complete channel estimation (e.g., processing the samples and converting the samples to frequency domain), which may reduce processing at the XR device 610.

As indicated above, FIG. 7 is provided as an example. Other examples may differ from what is described with respect to FIG. 7.

Figure 8:
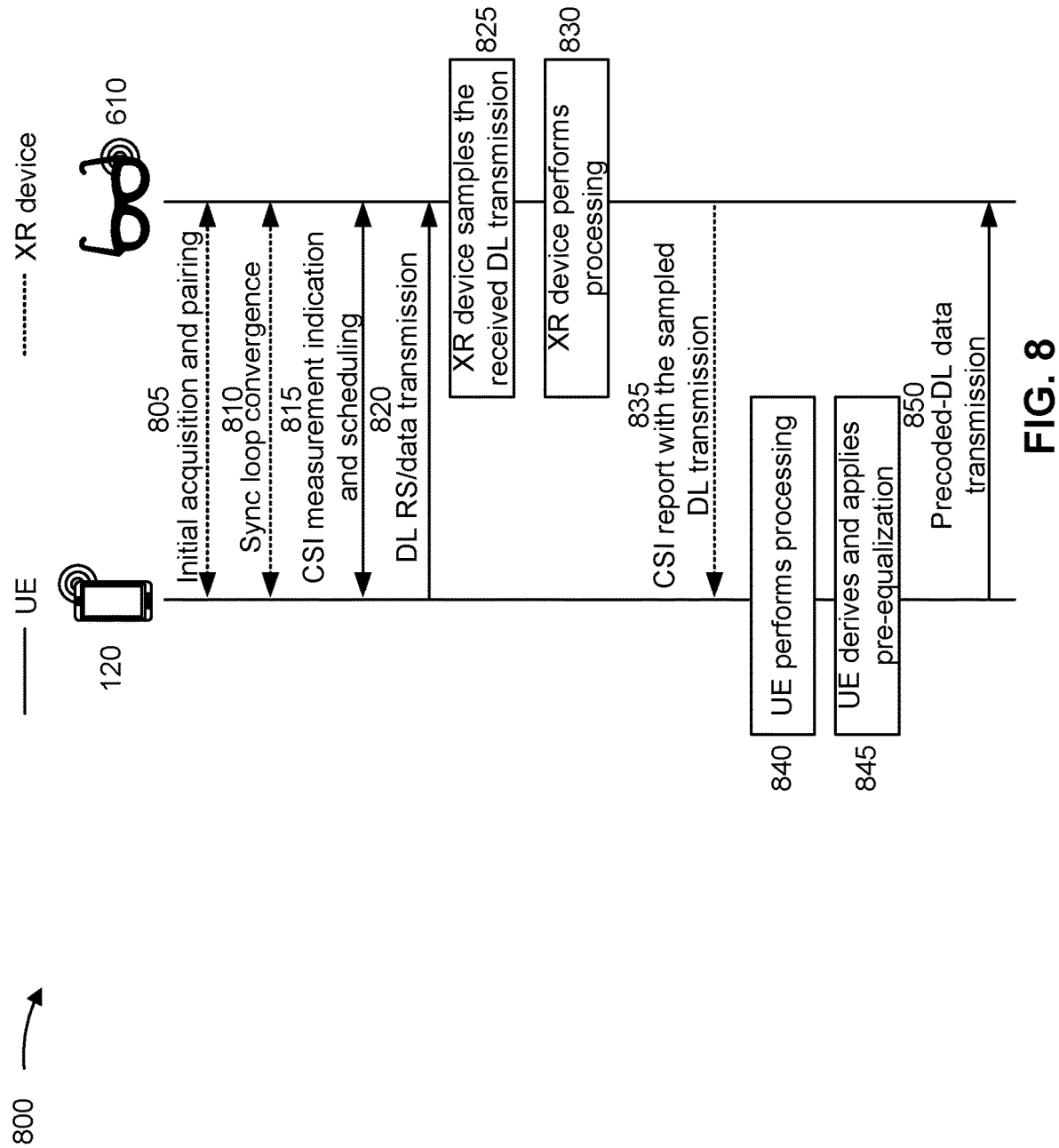
FIG. 8 is a diagram of an example associated with a partial CSI report session between the XR device and the UE, in accordance with the present disclosure.

FIG. 8 is a diagram of an example 800 associated with a partial CSI report session between the XR device 610 and the UE 120, in accordance with the present disclosure. In this example, the XR device 610 and the UE 120 may be capable of supporting the equalization offloading techniques described herein, with the UE 120 acting as the master device for the XR sidelink.

As shown by reference number 805, the XR device 610 may establish a wireless connection by pairing with the UE 120 via an initial acquisition procedure. During the initial acquisition procedure, the XR device 610 may report capabilities of the XR device 610 relating to receiving, sampling, and re-transmitting a CSI report (e.g., a partial CSI report) to the UE 120. As shown by reference number 810, the XR device 610 may synchronize to the UE 120 via a sync loop convergence operation.

As shown by reference number 815, the UE 120 may transmit, and the XR device 610 may receive, a CSI measurement indication and scheduling configuration. For example, the configuration may configure the XR device 610 to perform the CSI measurement and schedule a CSI report (e.g., a partial CSI report). Partial CSI report scheduling may be indicated via downlink control information (DCI), MAC control element (MAC-CE), RRC, or the like.

If the partial CSI reporting is to be periodic or semi-periodic, then the resource allocation may also be periodic. For example, both downlink RS and CSI report resources may be RRC configured, and the report may be transmitted in an uplink resource that is relative to the downlink resource (e.g., the uplink resource may be a known time offset from the downlink resource), which may enable the UE 120 to determine that the report is based on the downlink transmission. The periodicity of the partial CSI report may be based on channel conditions, XR device mobility, Doppler shift effect derived from sample pilots processed by the UE 120, or the like.

If the partial CSI reporting is to be aperiodic, then the report triggering may be accomplished via DCI and an uplink allocation for the report may be coupled to the downlink transmission, which may enable the UE 120 to determine that the report is based on the downlink transmission.

As shown by reference number 820, the UE 120 may transmit, and the XR device 610 may receive, the downlink transmission containing RS or data. As shown by reference number 825, the XR device 610 may sample the downlink transmission and, as shown by reference number 830, perform processing operations as described in relation to FIG. 7 above.

As shown by reference number 835, the XR device 610 may transmit, and the UE 120 may receive, a CSI report with the samples from the downlink transmission. As shown by reference number 840, the UE 120 may perform processing operations as described in relation to FIG. 7 above.

As shown by reference number 845, upon acquiring the Rx side CSI, the UE 120 may derive the pre-equalization parameters based on the samples and apply the Tx pre-equalization to another downlink transmission. As shown by reference number 850, the UE 120 may transmit, and the XR device 610 may receive, the pre-equalized downlink data transmission.

The operations shown in FIG. 8 may allow a companion device (e.g., UE 120) to obtain downlink CSI efficiently and with low complexity for the XR device 610, including in scenarios and duplexing approaches where channel reciprocity does not hold. Example 800 may support aggressive complexity offloading (e.g., modem complexity offloading) from the XR device 610, thereby helping to approximate the XR device 610 as an I/O device. Shifting the channel estimation related complexity and functionality from the XR device 610 to the UE 120 may reduce modem power consumption at the XR device 610 (e.g., at the Rx side of the modem). As a result, the XR device 610 may employ simplified XR modem hardware.

As indicated above, FIG. 8 is provided as an example. Other examples may differ from what is described with respect to FIG. 8.

In some examples, the CSI may be outdated and a fallback mechanism may be used. For example, the UE 120 may transmit, and the XR device 610 may receive, a downlink transmission, and the XR device 610 may transmit, and the UE 120 may receive, an uplink transmission. The uplink transmission may include CSI including an indication of one or more samples of the downlink transmission. The one or more samples, before reception of the second uplink transmission, may be unprocessed for a channel estimation.

The uplink transmission may be transmitted and/or received a period of time after the downlink transmission is transmitted and/or received. For example, the period of time may be greater than a threshold amount of time, which may indicate that the CSI is outdated (e.g., no longer useful for channel estimation). Rather than use outdated CSI for channel estimation, the UE 120 may instead revert to XR device side equalization. For example, the UE 120 may transmit, and the XR device 610 may receive, based at least in part on the uplink transmission being transmitting and/or received the period of time after the downlink transmission is transmitted and/or received, another downlink transmission. The other downlink transmission may include one or more RSs (e.g., DMRSs) on a slot. The XR device 610 may perform channel equalization for the downlink channel based on the one or more RSs. Thus, transmitting and receiving the RSs may enable channel equalization when the CSI is outdated.

Figure 9:
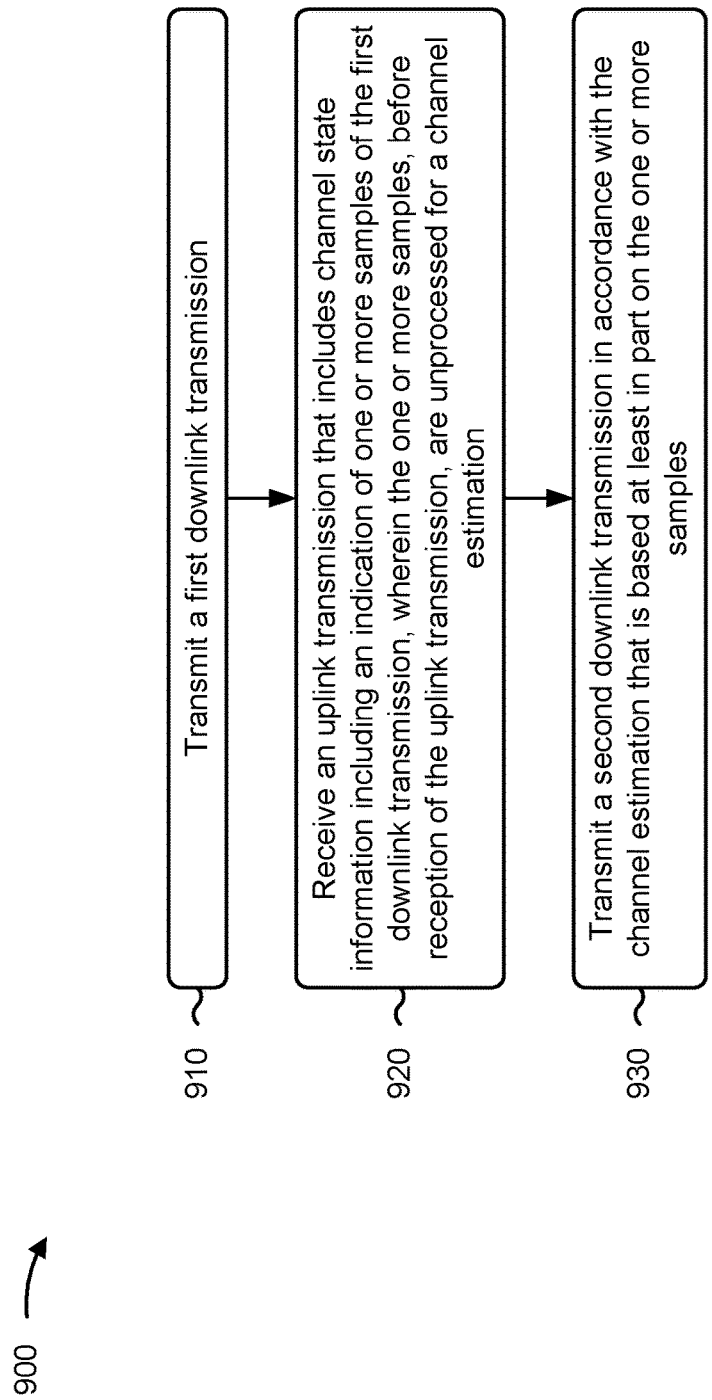
FIG. 9 is a diagram illustrating an example process performed, for example, by a UE, in accordance with the present disclosure.

FIG. 9 is a diagram illustrating an example process 900 performed, for example, by a UE, in accordance with the present disclosure. Example process 900 is an example where the UE (e.g., UE 120) performs operations associated with channel estimation based on one or more samples of a downlink transmission.

As shown in FIG. 9, in some aspects, process 900 may include transmitting a first downlink transmission (block 910). For example, the UE (e.g., using transmission component 1104 and/or communication manager 1106, depicted in FIG. 11) may transmit a first downlink transmission, as described above.

As further shown in FIG. 9, in some aspects, process 900 may include receiving an uplink transmission that includes CSI including an indication of one or more samples of the first downlink transmission, wherein the one or more samples, before reception of the uplink transmission, are unprocessed for a channel estimation (block 920). For example, the UE (e.g., using reception component 1102 and/or communication manager 1106, depicted in FIG. 11) may receive an uplink transmission that includes CSI including an indication of one or more samples of the first downlink transmission, wherein the one or more samples, before reception of the uplink transmission, are unprocessed for a channel estimation, as described above.

As further shown in FIG. 9, in some aspects, process 900 may include transmitting a second downlink transmission in accordance with the channel estimation that is based at least in part on the one or more samples (block 930). For example, the UE (e.g., using transmission component 1104 and/or communication manager 1106, depicted in FIG. 11) may transmit a second downlink transmission in accordance with the channel estimation that is based at least in part on the one or more samples, as described above.

Process 900 may include additional aspects, such as any single aspect or any combination of aspects described below and/or in connection with one or more other processes described elsewhere herein.

In a first aspect, process 900 includes performing the channel estimation based at least in part on the one or more samples.

In a second aspect, alone or in combination with the first aspect, a downlink channel that carries the first downlink transmission and the second downlink transmission is not reciprocal with an uplink channel that carries the uplink transmission.

In a third aspect, alone or in combination with one or more of the first and second aspects, a downlink channel that carries the first downlink transmission and the second downlink transmission is reciprocal with an uplink channel that carries the uplink transmission.

In a fourth aspect, alone or in combination with one or more of the first through third aspects, the one or more samples include one or more reference signals.

In a fifth aspect, alone or in combination with one or more of the first through fourth aspects, the one or more samples include one or more data samples.

In a sixth aspect, alone or in combination with one or more of the first through fifth aspects, the one or more samples are sampled in a time domain.

In a seventh aspect, alone or in combination with one or more of the first through sixth aspects, the one or more samples are sampled in a frequency domain.

In an eighth aspect, alone or in combination with one or more of the first through seventh aspects, the one or more samples are sampled at a first rate that is lower than a second rate at which a plurality of samples are transmitted in the first downlink transmission.

In a ninth aspect, alone or in combination with one or more of the first through eighth aspects, the uplink transmission is a first uplink transmission, and the one or more samples are encoded in the first uplink transmission via a first MCS that is lower than a second MCS of a second uplink transmission.

In a tenth aspect, alone or in combination with one or more of the first through ninth aspects, receiving the uplink transmission includes receiving the uplink transmission at an uplink occasion that occurs at least a period of time after a downlink occasion that carries the first downlink transmission, wherein the period of time is a minimum period of time involved in transmission of the uplink transmission after reception of the first downlink transmission.

In an eleventh aspect, alone or in combination with one or more of the first through tenth aspects, the first downlink transmission occurs, at least in part, at a last symbol of a first slot, and the uplink occasion occurs on a second slot that is successive to the first slot.

In a twelfth aspect, alone or in combination with one or more of the first through eleventh aspects, process 900 includes decoding the CSI, demodulating the CSI, descrambling the CSI, removing CRC bits of the CSI, reconstructing the one or more samples, or any combination thereof.

In a thirteenth aspect, alone or in combination with one or more of the first through twelfth aspects, process 900 includes estimating noise based at least in part on the one or more samples.

In a fourteenth aspect, alone or in combination with one or more of the first through thirteenth aspects, the uplink transmission is a first uplink transmission, the CSI is first CSI, the one or more samples are one or more first samples, and the channel estimation is a first channel estimation, and process 900 includes transmitting a third downlink transmission; receiving, a period of time after transmitting the third downlink transmission, a second uplink transmission that includes second CSI including an indication of one or more second samples of the third downlink transmission, wherein the one or more second samples, before reception of the second uplink transmission, are unprocessed for a second channel estimation; and transmitting, based at least in part on receiving the second uplink transmission the period of time after transmitting the third downlink transmission, a fourth downlink transmission that includes one or more reference signals.

Although FIG. 9 shows example blocks of process 900, in some aspects, process 900 may include additional blocks, fewer blocks, different blocks, or differently arranged blocks than those depicted in FIG. 9. Additionally, or alternatively, two or more of the blocks of process 900 may be performed in parallel.

Figure 10:
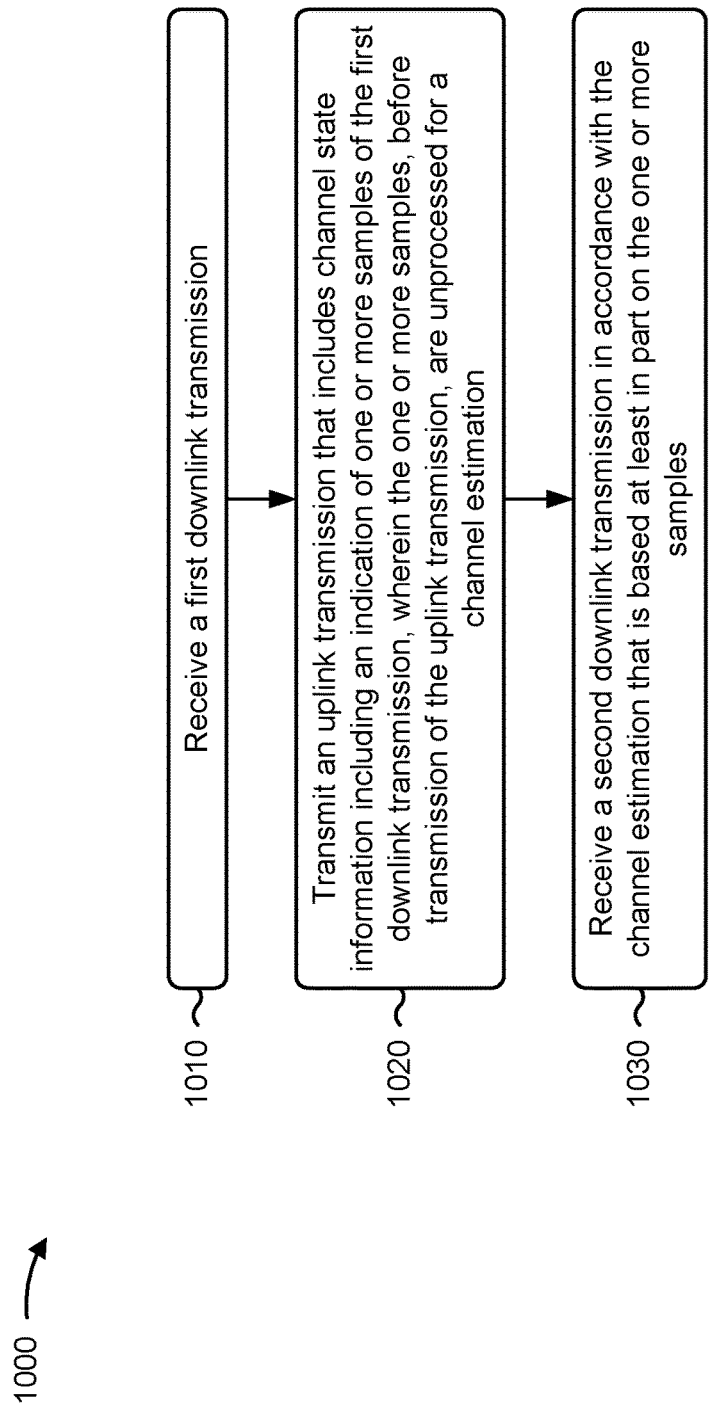
FIG. 10 is a diagram illustrating an example process performed, for example, by an XR device, in accordance with the present disclosure.

FIG. 10 is a diagram illustrating an example process 1000 performed, for example, by an XR device, in accordance with the present disclosure. Example process 1000 is an example where the XR device (e.g., XR device 610) performs operations associated with channel estimation based on one or more samples of a downlink transmission.

As shown in FIG. 10, in some aspects, process 1000 may include receiving a first downlink transmission (block 1010). For example, the XR device (e.g., using reception component 1202 and/or communication manager 1206, depicted in FIG. 12) may receive a first downlink transmission, as described above.

As further shown in FIG. 10, in some aspects, process 1000 may include transmitting an uplink transmission that includes CSI including an indication of one or more samples of the first downlink transmission, wherein the one or more samples, before transmission of the uplink transmission, are unprocessed for a channel estimation (block 1020). For example, the XR device (e.g., using transmission component 1204 and/or communication manager 1206, depicted in FIG. 12) may transmit an uplink transmission that includes CSI including an indication of one or more samples of the first downlink transmission, wherein the one or more samples, before transmission of the uplink transmission, are unprocessed for a channel estimation, as described above.

As further shown in FIG. 10, in some aspects, process 1000 may include receiving a second downlink transmission in accordance with the channel estimation that is based at least in part on the one or more samples (block 1030). For example, the XR device (e.g., using reception component 1202 and/or communication manager 1206, depicted in FIG. 12) may receive a second downlink transmission in accordance with the channel estimation that is based at least in part on the one or more samples, as described above.

Process 1000 may include additional aspects, such as any single aspect or any combination of aspects described below and/or in connection with one or more other processes described elsewhere herein.

In a first aspect, a downlink channel that carries the first downlink transmission and the second downlink transmission is not reciprocal with an uplink channel that carries the uplink transmission.

In a second aspect, alone or in combination with the first aspect, the one or more samples include one or more data samples.

In a third aspect, alone or in combination with one or more of the first and second aspects, the one or more samples are sampled in a frequency domain.

In a fourth aspect, alone or in combination with one or more of the first through third aspects, transmitting the uplink transmission includes transmitting the uplink transmission at an uplink occasion that occurs at least a period of time after a downlink occasion that carries the first downlink transmission, wherein the period of time is a minimum period of time involved in transmission of the uplink transmission after reception of the first downlink transmission.

In a fifth aspect, alone or in combination with one or more of the first through fourth aspects, the uplink transmission is a first uplink transmission, the CSI is first CSI, the one or more samples are one or more first samples, and the channel estimation is a first channel estimation, and process 1000 includes receiving a third downlink transmission; transmitting, a period of time after receiving the third downlink transmission, a second uplink transmission that includes second CSI including an indication of one or more second samples of the third downlink transmission, wherein the one or more second samples, before transmission of the second uplink transmission, are unprocessed for a second channel estimation; receiving, based at least in part on transmitting the second uplink transmission the period of time after receiving the third downlink transmission, a fourth downlink transmission that includes one or more reference signals; and transmitting a third uplink transmission in accordance with the second channel estimation based at least in part on the one or more reference signals.

Although FIG. 10 shows example blocks of process 1000, in some aspects, process 1000 may include additional blocks, fewer blocks, different blocks, or differently arranged blocks than those depicted in FIG. 10. Additionally, or alternatively, two or more of the blocks of process 1000 may be performed in parallel.

Figure 11:
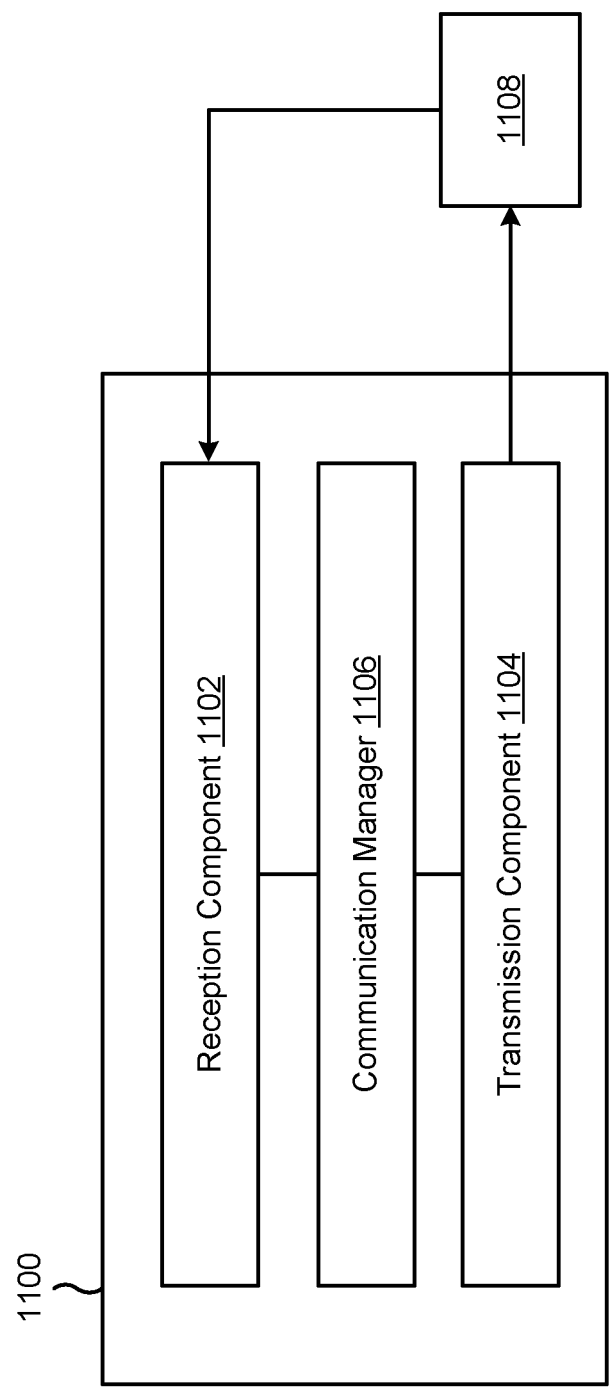
FIG. 11 is a diagram of an example apparatus for wireless communication, in accordance with the present disclosure.

FIG. 11 is a diagram of an example apparatus 1100 for wireless communication, in accordance with the present disclosure. The apparatus 1100 may be a UE, or a UE may include the apparatus 1100. In some aspects, the apparatus 1100 includes a reception component 1102, a transmission component 1104, and/or a communication manager 1106, which may be in communication with one another (for example, via one or more buses and/or one or more other components). In some aspects, the communication manager 1106 is the communication manager 140 described in connection with FIG. 1. As shown, the apparatus 1100 may communicate with another apparatus 1108, such as a UE or a network node (such as a CU, a DU, an RU, or a base station), using the reception component 1102 and the transmission component 1104.

In some aspects, the apparatus 1100 may be configured to perform one or more operations described herein in connection with FIGS. 6-8. Additionally, or alternatively, the apparatus 1100 may be configured to perform one or more processes described herein, such as process 900 of FIG. 9. In some aspects, the apparatus 1100 and/or one or more components shown in FIG. 11 may include one or more components of the UE 120 described in connection with FIG. 2. Additionally, or alternatively, one or more components shown in FIG. 11 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1102 may receive communications, such as reference signals, control information, data communications, or a combination thereof, from the apparatus 1108. The reception component 1102 may provide received communications to one or more other components of the apparatus 1100. In some aspects, the reception component 1102 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1100. In some aspects, the reception component 1102 may include one or more antennas, a modem, a demodulator, a MIMO detector, a receive processor, a controller/processor, a memory, or a combination thereof, of the UE described in connection with FIG. 2.

The transmission component 1104 may transmit communications, such as reference signals, control information, data communications, or a combination thereof, to the apparatus 1108. In some aspects, one or more other components of the apparatus 1100 may generate communications and may provide the generated communications to the transmission component 1104 for transmission to the apparatus 1108. In some aspects, the transmission component 1104 may perform signal processing on the generated communications (such as filtering, amplification, modulation, digital-to-analog conversion, multiplexing, interleaving, mapping, or encoding, among other examples), and may transmit the processed signals to the apparatus 1108. In some aspects, the transmission component 1104 may include one or more antennas, a modem, a modulator, a transmit MIMO processor, a transmit processor, a controller/processor, a memory, or a combination thereof, of the UE described in connection with FIG. 2. In some aspects, the transmission component 1104 may be co-located with the reception component 1102 in a transceiver.

The communication manager 1106 may support operations of the reception component 1102 and/or the transmission component 1104. For example, the communication manager 1106 may receive information associated with configuring reception of communications by the reception component 1102 and/or transmission of communications by the transmission component 1104. Additionally, or alternatively, the communication manager 1106 may generate and/or provide control information to the reception component 1102 and/or the transmission component 1104 to control reception and/or transmission of communications.

The transmission component 1104 may transmit a first downlink transmission. The reception component 1102 may receive an uplink transmission that includes CSI including an indication of one or more samples of the first downlink transmission, wherein the one or more samples, before reception of the uplink transmission, are unprocessed for a channel estimation. The transmission component 1104 may transmit a second downlink transmission in accordance with the channel estimation that is based at least in part on the one or more samples.

The number and arrangement of components shown in FIG. 11 are provided as an example. In practice, there may be additional components, fewer components, different components, or differently arranged components than those shown in FIG. 11. Furthermore, two or more components shown in FIG. 11 may be implemented within a single component, or a single component shown in FIG. 11 may be implemented as multiple, distributed components. Additionally, or alternatively, a set of (one or more) components shown in FIG. 11 may perform one or more functions described as being performed by another set of components shown in FIG. 11.

Figure 12:
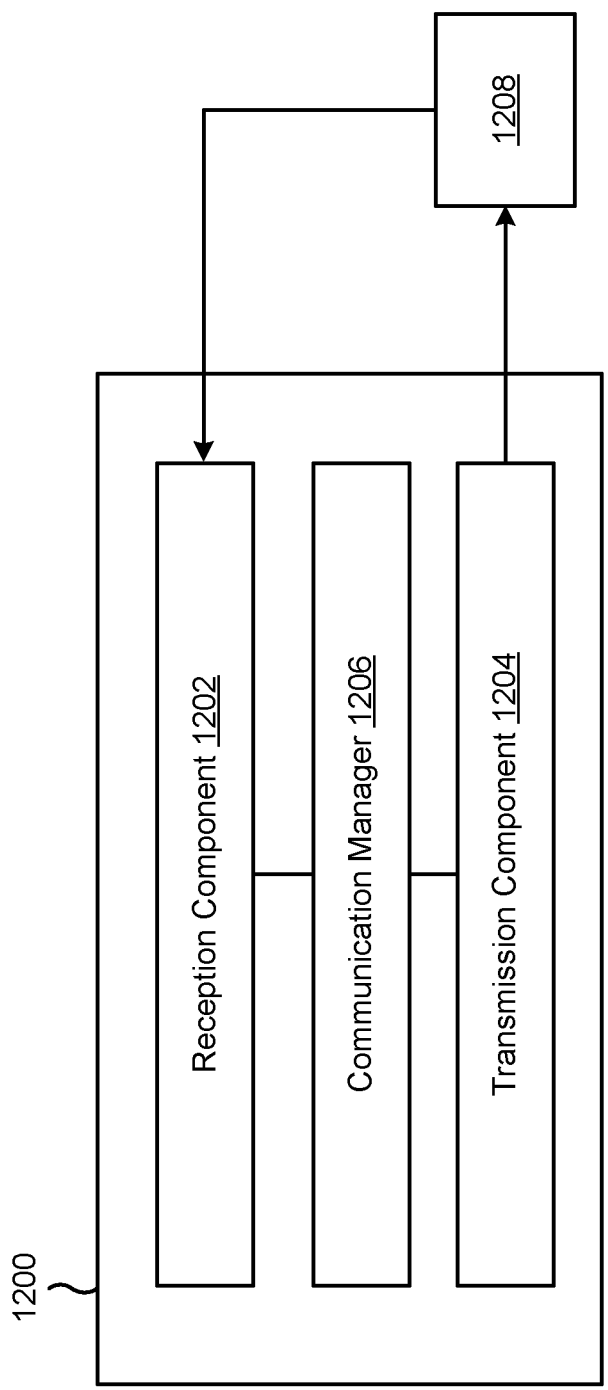
FIG. 12 is a diagram of an example apparatus for wireless communication, in accordance with the present disclosure.

FIG. 12 is a diagram of an example apparatus 1200 for wireless communication, in accordance with the present disclosure. The apparatus 1200 may be an XR device, or an XR device may include the apparatus 1200. In some aspects, the apparatus 1200 includes a reception component 1202, a transmission component 1204, and/or a communication manager 1206, which may be in communication with one another (for example, via one or more buses and/or one or more other components). In some aspects, the communication manager 1106 is the communication manager 150 described in connection with FIG. 1. As shown, the apparatus 1200 may communicate with another apparatus 1208, such as a UE or a network node (such as a CU, a DU, an RU, or a base station), using the reception component 1202 and the transmission component 1204.

In some aspects, the apparatus 1200 may be configured to perform one or more operations described herein in connection with FIGS. 6-8. Additionally, or alternatively, the apparatus 1200 may be configured to perform one or more processes described herein, such as process 1000 of FIG. 10. In some aspects, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1202 may receive communications, such as reference signals, control information, data communications, or a combination thereof, from the apparatus 1208. The reception component 1202 may provide received communications to one or more other components of the apparatus 1200. In some aspects, the reception component 1202 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1200. In some aspects, the reception component 1202 may include one or more antennas, a modem, a demodulator, a MIMO detector, a receive processor, a controller/processor, a memory, or a combination thereof.

The transmission component 1204 may transmit communications, such as reference signals, control information, data communications, or a combination thereof, to the apparatus 1208. In some aspects, one or more other components of the apparatus 1200 may generate communications and may provide the generated communications to the transmission component 1204 for transmission to the apparatus 1208. In some aspects, the transmission component

1204 may perform signal processing on the generated communications (such as filtering, amplification, modulation, digital-to-analog conversion, multiplexing, interleaving, mapping, or encoding, among other examples), and may transmit the processed signals to the apparatus 1208. In some aspects, the transmission component 1204 may include one or more antennas, a modem, a modulator, a transmit MIMO processor, a transmit processor, a controller/processor, a memory, or a combination thereof. In some aspects, the transmission component 1204 may be co-located with the reception component 1202 in a transceiver.

The communication manager 1206 may support operations of the reception component 1202 and/or the transmission component 1204. For example, the communication manager 1206 may receive information associated with configuring reception of communications by the reception component 1202 and/or transmission of communications by the transmission component 1204. Additionally, or alternatively, the communication manager 1206 may generate and/or provide control information to the reception component 1202 and/or the transmission component 1204 to control reception and/or transmission of communications.

The reception component 1202 may receive a first downlink transmission. The transmission component 1204 may transmit an uplink transmission that includes CSI including an indication of one or more samples of the first downlink transmission, wherein the one or more samples, before transmission of the uplink transmission, are unprocessed for a channel estimation. The reception component 1202 may receive a second downlink transmission in accordance with the channel estimation that is based at least in part on the one or more samples.

The number and arrangement of components shown in FIG. 12 are provided as an example. In practice, there may be additional components, fewer components, different components, or differently arranged components than those shown in FIG. 12. Furthermore, two or more components shown in FIG. 12 may be implemented within a single component, or a single component shown in FIG. 12 may be implemented as multiple, distributed components. Additionally, or alternatively, a set of (one or more) components shown in FIG. 12 may perform one or more functions described as being performed by another set of components shown in FIG. 12.

The following provides an overview of some Aspects of the present disclosure:

Aspect 1: A method of wireless communication performed by a UE, comprising: transmitting a first downlink transmission; receiving an uplink transmission that includes CSI including an indication of one or more samples of the first downlink transmission, wherein the one or more samples, before reception of the uplink transmission, are unprocessed for a channel estimation; and transmitting a second downlink transmission in accordance with the channel estimation that is based at least in part on the one or more samples.

Aspect 2: The method of Aspect 1, further comprising: performing the channel estimation based at least in part on the one or more samples.

Aspect 3: The method of any of Aspects 1-2, wherein a downlink channel that carries the first downlink transmission and the second downlink transmission is not reciprocal with an uplink channel that carries the uplink transmission.

Aspect 4: The method of any of Aspects 1-2, wherein a downlink channel that carries the first downlink transmission and the second downlink transmission is reciprocal with an uplink channel that carries the uplink transmission.

Aspect 5: The method of any of Aspects 1-4, wherein the one or more samples include one or more reference signals.

Aspect 6: The method of any of Aspects 1-5, wherein the one or more samples include one or more data samples.

Aspect 7: The method of any of Aspects 1-6, wherein the one or more samples are sampled in a time domain.

Aspect 8: The method of any of Aspects 1-7, wherein the one or more samples are sampled in a frequency domain.

Aspect 9: The method of Aspect 8, wherein the one or more samples are sampled at a first rate that is lower than a second rate at which a plurality of samples are transmitted in the first downlink transmission.

Aspect 10: The method of any of Aspects 1-9, wherein the uplink transmission is a first uplink transmission, and wherein the one or more samples are encoded in the first uplink transmission via a first MCS that is lower than a second MCS of a second uplink transmission.

Aspect 11: The method of any of Aspects 1-10, wherein receiving the uplink transmission includes: receiving the uplink transmission at an uplink occasion that occurs at least a period of time after a downlink occasion that carries the first downlink transmission, wherein the period of time is a minimum period of time involved in transmission of the uplink transmission after reception of the first downlink transmission.

Aspect 12: The method of Aspect 11, wherein the first downlink transmission occurs, at least in part, at a last symbol of a first slot, and wherein the uplink occasion occurs on a second slot that is successive to the first slot.

Aspect 13: The method of any of Aspects 1-12, further comprising: decoding the CSI; demodulating the CSI; descrambling the CSI; removing CRC bits of the CSI; reconstructing the one or more samples; or any combination thereof.

Aspect 14: The method of any of Aspects 1-13, further comprising: estimating noise based at least in part on the one or more samples.

Aspect 15: The method of any of Aspects 1-14, wherein the uplink transmission is a first uplink transmission, wherein the CSI is first CSI, wherein the one or more samples are one or more first samples, and wherein the channel estimation is a first channel estimation, the method further comprising: transmitting a third downlink transmission; receiving, a period of time after transmitting the third downlink transmission, a second uplink transmission that includes second CSI including an indication of one or more second samples of the third downlink transmission, wherein the one or more second samples, before reception of the second uplink transmission, are unprocessed for a second channel estimation; and transmitting, based at least in part on receiving the second uplink transmission the period of time after transmitting the third downlink transmission, a fourth downlink transmission that includes one or more reference signals.

Aspect 16: A method of wireless communication performed by an XR device, comprising: receiving a first downlink transmission; transmitting an uplink transmission that includes CSI including an indication of one or more samples of the first downlink transmission, wherein the one or more samples, before transmission of the uplink transmission, are unprocessed for a channel estimation; and receiving a second downlink transmission in accordance with the channel estimation that is based at least in part on the one or more samples.

Aspect 17: The method of Aspect 16, wherein a downlink channel that carries the first downlink transmission and the second downlink transmission is not reciprocal with an uplink channel that carries the uplink transmission.

Aspect 18: The method of any of Aspects 16-17, wherein the one or more samples include one or more data samples.

Aspect 19: The method of any of Aspects 16-18, wherein the one or more samples are sampled in a frequency domain.

Aspect 20: The method of any of Aspects 16-19, wherein transmitting the uplink transmission includes: transmitting the uplink transmission at an uplink occasion that occurs at least a period of time after a downlink occasion that carries the first downlink transmission, wherein the period of time is a minimum period of time involved in transmission of the uplink transmission after reception of the first downlink transmission.

Aspect 21: The method of any of Aspects 16-20, wherein the uplink transmission is a first uplink transmission, wherein the CSI is first CSI, wherein the one or more samples are one or more first samples, and wherein the channel estimation is a first channel estimation, the method further comprising: receiving a third downlink transmission; transmitting, a period of time after receiving the third downlink transmission, a second uplink transmission that includes second CSI including an indication of one or more second samples of the third downlink transmission, wherein the one or more second samples, before transmission of the second uplink transmission, are unprocessed for a second channel estimation; receiving, based at least in part on transmitting the second uplink transmission the period of time after receiving the third downlink transmission, a fourth downlink transmission that includes one or more reference signals; and transmitting a third uplink transmission in accordance with the second channel estimation based at least in part on the one or more reference signals.

Aspect 22: An apparatus for wireless communication at a device, comprising a processor; memory coupled with the processor; and instructions stored in the memory and executable by the processor to cause the apparatus to perform the method of one or more of Aspects 1-21.

Aspect 23: A device for wireless communication, comprising a memory and one or more processors coupled to the memory, the one or more processors configured to perform the method of one or more of Aspects 1-21.

Aspect 24: An apparatus for wireless communication, comprising at least one means for performing the method of one or more of Aspects 1-21.

Aspect 25: A non-transitory computer-readable medium storing code for wireless communication, the code comprising instructions executable by a processor to perform the method of one or more of Aspects 1-21.

Aspect 26: A non-transitory computer-readable medium storing a set of instructions for wireless communication, the set of instructions comprising one or more instructions that, when executed by one or more processors of a device, cause the device to perform the method of one or more of Aspects 1-21.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A user equipment (UE) for wireless communication, comprising:
   a memory; and
   one or more processors, coupled to the memory, configured to:
     transmit a first downlink transmission;
     receive an uplink transmission that includes channel state information including an indication of one or more samples of the first downlink transmission, wherein the one or more samples, before reception of the uplink transmission, are unprocessed for a channel estimation; and transmit a second downlink transmission in accordance with the channel estimation that is based at least in part on the one or more samples.

2. The UE of claim 1, wherein the one or more processors are further configured to:
perform the channel estimation based at least in part on the one or more samples.

3. The UE of claim 1, wherein a downlink channel that carries the first downlink transmission and the second downlink transmission is not reciprocal with an uplink channel that carries the uplink transmission.

4. The UE of claim 1, wherein a downlink channel that carries the first downlink transmission and the second downlink transmission is reciprocal with an uplink channel that carries the uplink transmission.

5. The UE of claim 1, wherein the one or more samples include one or more reference signals.

6. The UE of claim 1, wherein the one or more samples include one or more data samples.

7. The UE of claim 1, wherein the one or more samples are sampled in a time domain.

8. The UE of claim 1, wherein the one or more samples are sampled in a frequency domain.

9. The UE of claim 8, wherein the one or more samples are sampled at a first rate that is lower than a second rate at which a plurality of samples are transmitted in the first downlink transmission.

10. The UE of claim 1, wherein the uplink transmission is a first uplink transmission, and wherein the one or more samples are encoded in the first uplink transmission via a first modulation and coding scheme that is lower than a second modulation and coding scheme of a second uplink transmission.

11. The UE of claim 1, wherein the one or more processors, to receive the uplink transmission, are configured to:
receive the uplink transmission at an uplink occasion that occurs at least a period of time after a downlink occasion that carries the first downlink transmission, wherein the period of time is a minimum period of time involved in transmission of the uplink transmission after reception of the first downlink transmission.

12. The UE of claim 11, wherein the first downlink transmission occurs, at least in part, at a last symbol of a first slot, and wherein the uplink occasion occurs on a second slot that is successive to the first slot.

13. The UE of claim 1, wherein the one or more processors are further configured to:
decode the channel state information;
demodulate the channel state information;
descramble the channel state information;
remove cyclic redundancy check bits of the channel state information;
reconstruct the one or more samples;
or any combination thereof.

14. The UE of claim 1, wherein the one or more processors are further configured to:
estimate noise based at least in part on the one or more samples.

15. The UE of claim 1, wherein the uplink transmission is a first uplink transmission, wherein the channel state information is first channel state information, wherein the one or more samples are one or more first samples, and wherein the channel estimation is a first channel estimation, wherein the one or more processors are further configured to:

transmit a third downlink transmission;
receive, a period of time after transmitting the third downlink transmission, a second uplink transmission that includes second channel state information including an indication of one or more second samples of the third downlink transmission, wherein the one or more second samples, before reception of the second uplink transmission, are unprocessed for a second channel estimation; and
transmit, based at least in part on receiving the second uplink transmission the period of time after transmitting the third downlink transmission, a fourth downlink transmission that includes one or more reference signals.

16. A extended reality device for wireless communication, comprising:
a memory; and
one or more processors, coupled to the memory, configured to:
receive a first downlink transmission;
transmit an uplink transmission that includes channel state information including an indication of one or more samples of the first downlink transmission, wherein the one or more samples, before transmission of the uplink transmission, are unprocessed for a channel estimation; and
receive a second downlink transmission in accordance with the channel estimation that is based at least in part on the one or more samples.

17. The extended reality device of claim 16, wherein a downlink channel that carries the first downlink transmission and the second downlink transmission is not reciprocal with an uplink channel that carries the uplink transmission.

18. The extended reality device of claim 16, wherein the one or more samples include one or more data samples.

19. The extended reality device of claim 16, wherein the one or more samples are sampled in a frequency domain.

20. The extended reality device of claim 16, wherein the one or more processors, to transmit the uplink transmission, are configured to:
transmit the uplink transmission at an uplink occasion that occurs at least a period of time after a downlink occasion that carries the first downlink transmission, wherein the period of time is a minimum period of time involved in transmission of the uplink transmission after reception of the first downlink transmission.

21. The extended reality device of claim 16, wherein the uplink transmission is a first uplink transmission, wherein the channel state information is first channel state information, wherein the one or more samples are one or more first samples, and wherein the channel estimation is a first channel estimation, wherein the one or more processors are further configured to:
receive a third downlink transmission;
transmit, a period of time after receiving the third downlink transmission, a second uplink transmission that includes second channel state information including an indication of one or more second samples of the third downlink transmission, wherein the one or more second samples, before transmission of the second uplink transmission, are unprocessed for a second channel estimation;
receive, based at least in part on transmitting the second uplink transmission the period of time after receiving the third downlink transmission, a fourth downlink transmission that includes one or more reference signals; and transmit a third uplink transmission in accordance with the second channel estimation based at least in part on the one or more reference signals.

22. A method of wireless communication performed by a user equipment (UE), comprising:
   transmitting a first downlink transmission;
   receiving an uplink transmission that includes channel state information including an indication of one or more samples of the first downlink transmission, wherein the one or more samples, before reception of the uplink transmission, are unprocessed for a channel estimation; and
   transmitting a second downlink transmission in accordance with the channel estimation that is based at least in part on the one or more samples.

23. The method of claim 22, wherein a downlink channel that carries the first downlink transmission and the second downlink transmission is not reciprocal with an uplink channel that carries the uplink transmission.

24. The method of claim 22, wherein the one or more samples include one or more data samples.

25. The method of claim 22, wherein the one or more samples are sampled in a frequency domain.

26. The method of claim 22, wherein transmitting the uplink transmission includes:
   transmitting the uplink transmission at an uplink occasion that occurs at least a period of time after a downlink occasion that carries the first downlink transmission, wherein the period of time is a minimum period of time involved in transmission of the uplink transmission after reception of the first downlink transmission.

27. A method of wireless communication performed by an extended reality device, comprising:
   receiving a first downlink transmission;
   transmitting an uplink transmission that includes channel state information including an indication of one or more samples of the first downlink transmission, wherein the one or more samples, before transmission of the uplink transmission, are unprocessed for a channel estimation; and
   receiving a second downlink transmission in accordance with the channel estimation that is based at least in part on the one or more samples.

28. The method of claim 27, wherein a downlink channel that carries the first downlink transmission and the second downlink transmission is not reciprocal with an uplink channel that carries the uplink transmission.

29. The method of claim 27, wherein the one or more samples include one or more data samples.

30. The method of claim 27, wherein the one or more samples are sampled in a frequency domain.

* * * * *